United States Patent [19]
Shimizu et al.

[11] Patent Number: 5,444,592
[45] Date of Patent: Aug. 22, 1995

[54] PORTABLE POWER UNIT

[75] Inventors: Motohiro Shimizu; Masashi Nakamura, both of Wako, Japan

[73] Assignee: Honda Giken Kogyo Kabushiki Kaisha, Tokyo, Japan

[21] Appl. No.: 306,540

[22] Filed: Sep. 15, 1994

Related U.S. Application Data

[63] Continuation of Ser. No. 912,158, Jul. 10, 1992, abandoned.

[30] Foreign Application Priority Data

Jul. 12, 1991 [JP] Japan .................. 3-198401

[51] Int. Cl.⁶ .................. H02H 7/122; H02M 5/458
[52] U.S. Cl. .................. 361/21; 361/20; 361/18; 363/56; 322/25
[58] Field of Search .............. 361/18, 20, 21; 363/41, 363/56, 97; 322/25, 27

[56] References Cited

U.S. PATENT DOCUMENTS

| | | | |
|---|---|---|---|
| 4,013,925 | 3/1977 | Tice et al. | 361/18 |
| 4,629,966 | 12/1986 | Quantz | 322/25 |
| 4,751,629 | 6/1988 | Shimizu et al. | 363/37 |
| 5,077,485 | 12/1991 | Rashid | 307/84 |
| 5,258,700 | 11/1993 | Shimizu et al. | 322/25 |
| 5,282,124 | 1/1994 | Nakamura et al. | 363/56 |

FOREIGN PATENT DOCUMENTS 56-20782  5/1981  Japan .
62-145440 9/1987  Japan .

Primary Examiner—Todd DeBoer
Assistant Examiner—Ronald W. Leja
Attorney, Agent, or Firm—Frishauf, Holtz, Goodman, Langer & Chick

[57] ABSTRACT

A portable power unit has a protective circuit for cutting off an output current from the power unit when the power unit is in an overload state. An amount of the output current is detected. An output voltage from the power unit is reduced when the amount of the output current detected reaches a first threshold value, thereby preventing the protective circuit from undesirably operating for one power unit when it is connected for another for parallel operation. When the amount of the output current decreases to a second threshold value which is smaller than the first threshold value, with the power unit being in a state in which the output voltage is reduced, the voltage-reducing operation is canceled.

8 Claims, 18 Drawing Sheets

PORTABLE POWER UNIT

This application is a Continuation of application Ser. No. 07/912,158, filed Jul. 10, 1992, now abandoned.

BACKGROUND OF THE INVENTION

1. Field of the Invention

This invention relates to a portable power unit, such as a portable generator, and more particularly to a portable power unit having the function of preventing an excessive load current from flowing from part of a plurality of power units connected with each other for parallel operation due to variation in the output voltage characteristics between the power units.

2. Prior Art

When a plurality of power units, e.g. portable generators, connected in parallel with each other are in operation, if the output voltages from the generators are not synchronous, there occurs a difference between the output voltages. This causes electric current to flow from one generator into another generator, which can result in such an excessive amount of electric current flowing in the one generator as may destroy component parts thereof. Therefore, it is required to synchronize the output voltages from the generators.

To this end, even in the case of parallel operation of identically-constructed portable generators, it is required to provide wiring for transmitting signals for informing each other of operating conditions thereof. Further, as disclosed e.g. in Japanese Patent Publication (Kokoku) No. 56-20782, it is required to employ an automatic synchronizing device, and means for producing an operating point at which the phases coincide with each other in order to cause the automatic synchronizing device to operate promptly and reliably. Alternatively, as disclosed in Japanese Provisional Utility Model Publication (Kokai) No. 62-145440, a special adaptor has to be used for parallel operation of two portable generators, with one of them serving as a master generator while the other as a slave generator.

As an improvement in the prior art, the present assignee has proposed, in U.S. Ser. No. 07/824,178, now U.S. Pat. No. 5,258,700 a portable power unit which dispenses with the use of special means such as an automatic synchronizing device and a special adaptor for carrying out parallel operation of a plurality of portable generators.

This type of portable power unit is usually provided with a protective circuit for cutting off the supply of electric current to a load device when the power unit is in an excessively loaded state to thereby protect the output circuit, etc. off the power unit. However, when a plurality of power units of this type are connected together for parallel operation, as shown in FIG. 1, a greatest amount of load current flows from one power unit (one having an output characteristic S1 in the example shown in FIG. 1) having the highest output voltage level within the tolerance of the rated output voltage of the power units, so that the one power unit shares the greatest part of load, due to variation in the rated output voltage between the power units. The variation arises due to variations in manufacturing tolerances and temperature characteristics of circuit component parts between the power units. Although the variations are slight, they are very difficult to avoid. As a result, the operation of the protective circuit of the one power unit from which flows the greatest amount of load current determines the timing of protective operation for the whole power units in parallel operation even if outputs from the other power unit(s) is (or are) much lower than its (or their) capacities. Thus, the total output power from the whole portable power units in parallel operation is undesirably limited by the aforementioned operation of the protective circuit, which prevents parallel operation of the power units from fully achieving its purpose, i.e. increase in the output power. More specifically, in the example shown in FIG. 1, when the power unit having the output characteristic S1 outputs its maximum current IA, another power unit having an output characteristic S2 outputs only a current IB. As a result, the maximum total output power PM from the power units in parallel operation is limited as shown below:

$$PM = VM \, (IA + IB).$$

In this connection, $\Delta V$ in FIG. 1 designates a variation in the output voltage between the power unit.

SUMMARY OF THE INVENTION

It is the object of the invention to provide a portable generator which enables to obtain a sufficient total output power, i.e. the sum of output powers from a plurality of portable power units in parallel operation while allowing a protective circuit of each power unit to properly perform its function to the same degree as it is singly operated.

To attain the object, the present invention provides a portable power unit having a protective circuit for cutting off an output current from the power unit when the power unit is in an overload state.

The portable power unit according to the invention is characterized by comprising:

electric current-detecting means for detecting an amount of the output current;

voltage-reducing means for reducing an output voltage from the power unit when the amount of the output current detected by the electric current-detecting means reaches a first threshold value; and canceling means for canceling the operation of the voltage-reducing means, when the amount of the output current decreases to a second threshold value which is smaller than the first threshold value, while the power unit is in a state in which the output voltage is reduced by the voltage-reducing means.

Preferably, the portable power includes:

an alternating current generator having a primary output winding;

an invertor circuit for effecting, in response to a control signal, switching control of direct current obtained by rectifying alternating current generated by the primary output winding and smoothing the resulting rectified current;

an output circuit for supplying an output from the invertor circuit as alternating current output having a predetermined frequency;

output voltage phase-detecting means for detecting a phase of voltage of the alternating current output having the predetermined frequency and generating a signal indicative of the detected phase of voltage of the alternating current;

output current phase-detecting means for detecting a phase of current of the alternating current output having the predetermined frequency and generating a signal indicative of the detected phase of current of the alternating current;

phase difference-detecting means for detecting a phase difference between the detected phase of voltage and the detected phase of current and generating a signal indicative of the detected phase difference; and feedback means for controlling the driving signal supplied to the invertor circuit in a feedback manner based on the signal indicative of the detected phase difference outputted from the phase difference-detecting means, such that the phase difference is reduced.

More preferably, the protective circuit includes interrupting means for cutting off the output current when the output current has continued to be equal to or larger than the first threshold value over a predetermined time period.

Further preferably, the voltage-reducing means progressively reduces the output voltage as time elapses.

The above and other objects, features, and advantages of the invention will be more apparent from the ensuing detailed description taken in conjunction with the accompanying drawings.

DETAILED DESCRIPTION

The invention will now be described in detail with reference to the drawings showing an embodiment thereof.

Figure 1:
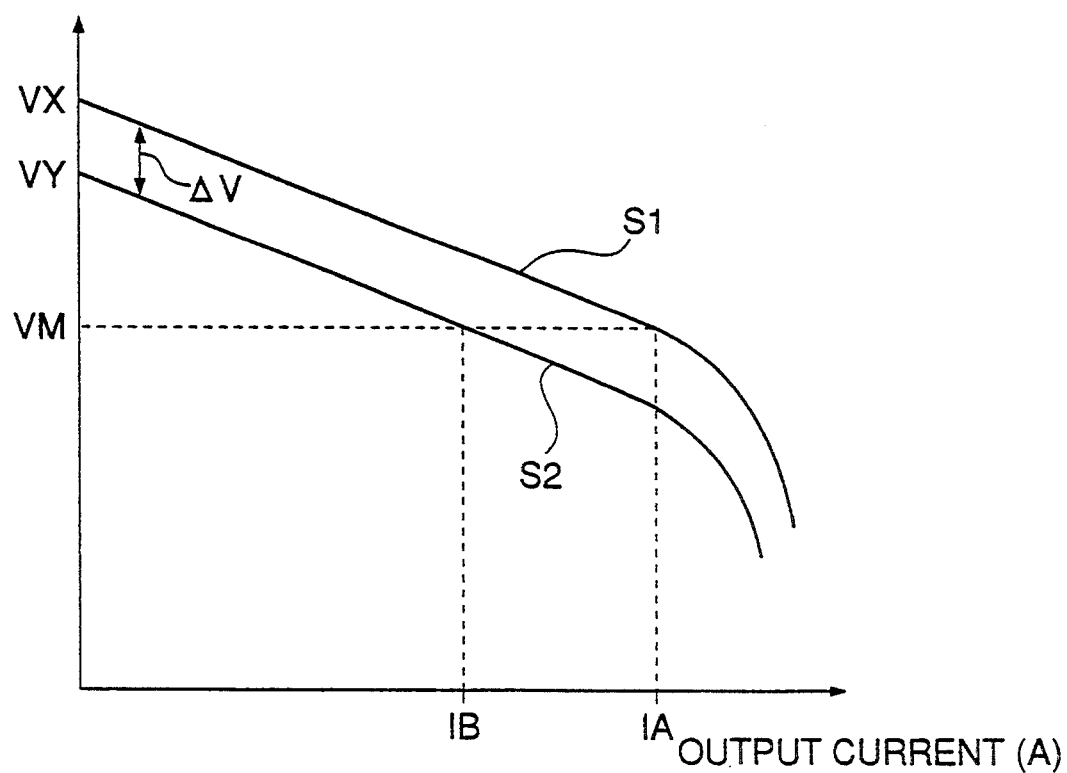
FIG. 1 is a graph useful in explaining how to determine the maximum output that is available during parallel operation of portable generators.
Figure 2:
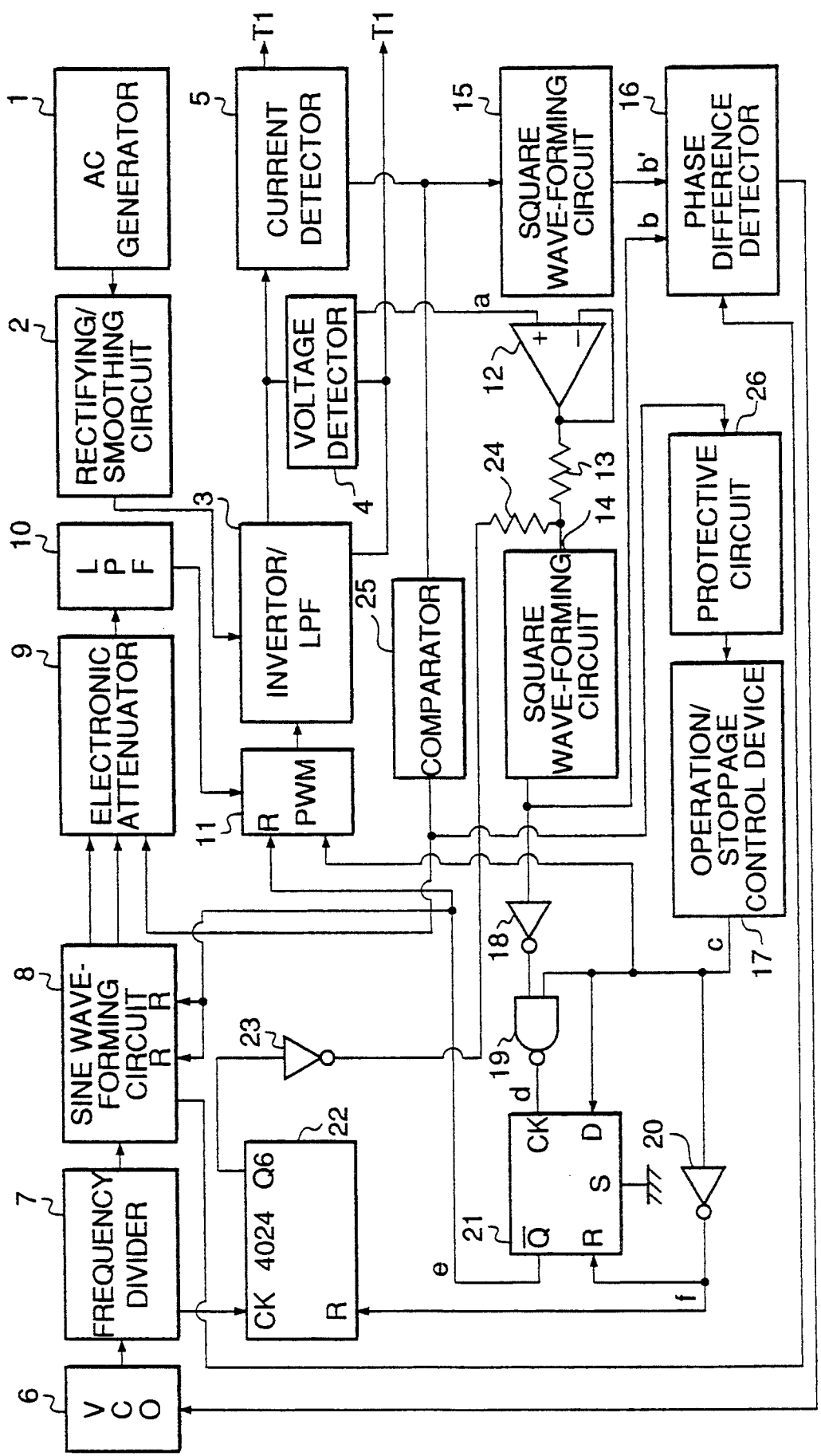
FIG. 2 is a circuit diagram schematically showing the whole arrangement of a portable power unit according to an embodiment of the invention.

Referring first to FIG. 2, there is shown the whole arrangement of a portable power unit according to the embodiment of the invention. In the figure, reference numeral 1 designates an AC generator 1 which has its output connected to the input of a rectifying/smoothing circuit 2. The output of the rectifying/smoothing circuit 2 is connected to the input of an invertor circuit and low-pass filter (hereinafter referred to as "the invertor/LPF") 3. The output of the invertor/LPF 3 is connected via a voltage detector 4 and a current detector 5 to output terminals T1, T1.

On the other hand, a voltage-controlled type oscillator (hereinafter referred to as "VCO") 6 which outputs an oscillation signal to be converted into a target output waveform signal has an output thereof connected to the input of a frequency divider 7. The output of the frequency divider 7 is connected to the input of a sine wave-forming circuit 8 for generating the target output waveform signal, and the output of the sine wave-forming circuit 8 is connected to the input of an electronic attenuator 9, which has an output thereof connected via a low-pass filter (hereinafter referred to as "the LPF") 10 to the input of a pulse width-modulator (hereinafter referred to as "PWM") 11.

Further, the output of the voltage detector 4 is connected to a non-inverting input terminal of an operational amplifier 12, the output of which is connected via a resistance 13 to the input of a square wave-forming circuit 14. The output of the square wave-forming circuit 14 is connected to the input of an invertor 18 and the input of a phase difference detector 16. The output of the current detector 5 is connected to the input of a square wave-forming circuit 15 and the input of a comparator circuit 25. The output of the square wave-forming circuit 15 is connected to the input of the phase difference detector 16. The output of the phase difference detector 16 is connected to the input of the VCO 6. The input of the phase difference detector 16 is also connected to the output of the sine wave-forming circuit 8. The output of the comparator circuit 25 is connected to a control input terminal of the electronic attenuator 9 and the input of a protective circuit 26.

Further, the input of a NAND circuit 19 is connected to the output of the invertor 18 as well as to the output of an operation/stoppage control device 17. The output of the operation/stoppage control device 17 is also connected to a D input terminal of a D flip flop 21 as well as to the input of an invertor 20. The input of the operation/stoppage control device 17 is connected to the output of the protective circuit 26. The operation/stoppage control device 17 has a control output terminal connected to an control input terminal of the PWM 11. The D flip flop 21 has a CK (clock) input terminal thereof connected to the output of the NAND circuit 19, an R (resetting) terminal thereof connected to the output of the invertor 20, and a Q-bar output (inverting output) terminal thereof connected to an R (resetting) terminal of the square wave-forming circuit 8 and an R (resetting) terminal of the PWM 11. Further, the output of the invertor 20 is connected to an R terminal of a counter 22. The counter 22 may be formed by, for example, a μPD4024 manufactured and sold by NEC Corporation, Tokyo, Japan. The counter 22 has a CK terminal thereof connected to the output of the frequency divider 7 and a Q6 output terminal thereof connected to the input of an invertor 23. The output of the invertor 23 is connected via a resistance 24 to the input of the square wave-forming circuit 14.

The parallel operation of the portable power units constructed as above is carried out by connecting the output terminals T1, T1 of one power unit to the output terminals T1, T1 of another power unit.

Next, the operation of the portable generator shown in FIG. 2 will be described.

Figure 3:
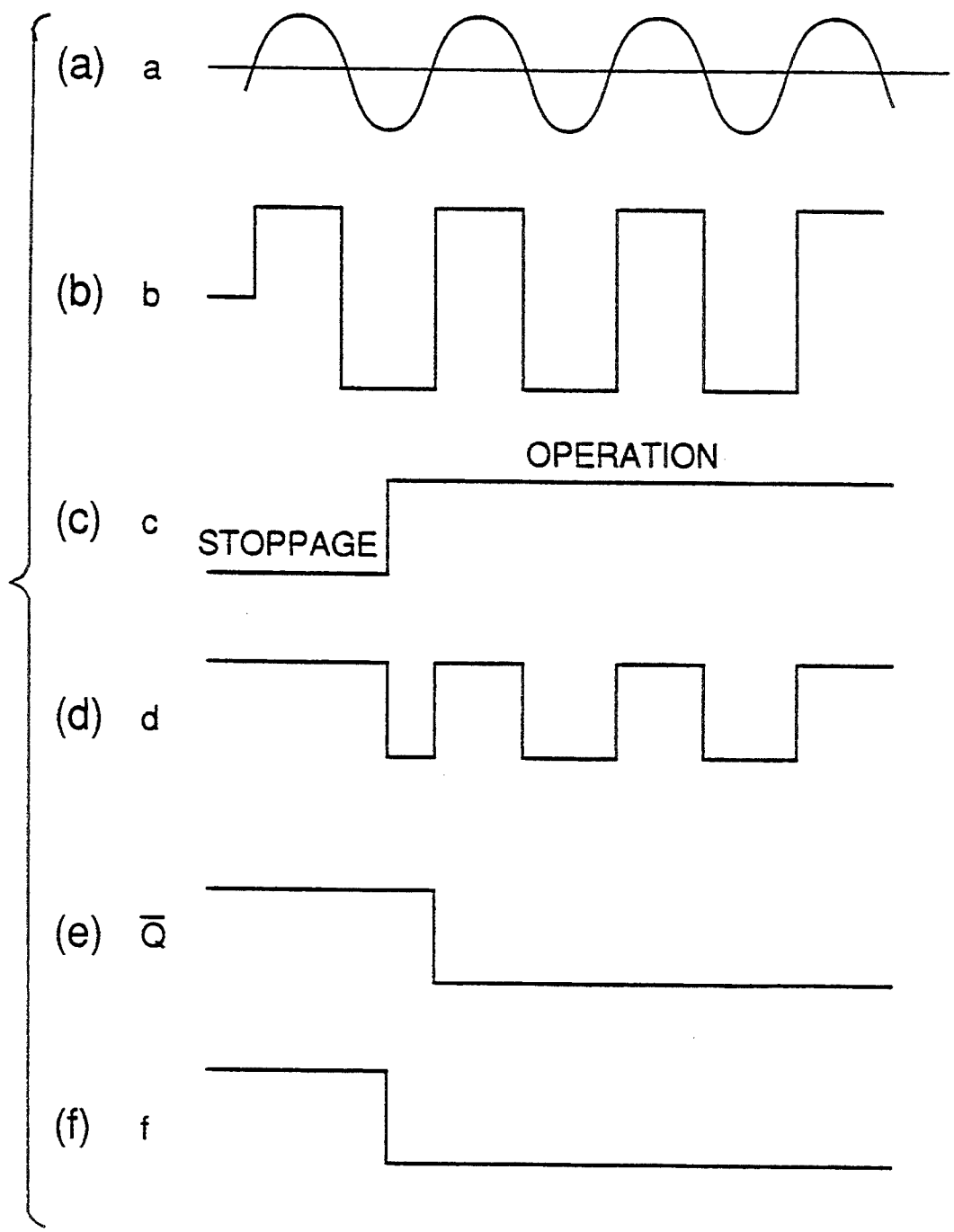
FIG. 3 is a timing chart useful in explaining the operation of the portable power unit shown in FIG. 2.

AC current from the AC generator 1 is rectified and smoothed by the rectifying/smoothing circuit 2 into DC power. The DC power is converted into AC power by the invertor/LPF 3 under the control of the PWM 11, and the resulting AC power is supplied via the voltage detector 4, the current detector 5, and the output terminals T1, T1 to a load connected to the output terminals T1, T1. An output voltage from the power unit is detected by the voltage detector 4, and an output voltage signal a indicative of the detected output voltage outputted from the voltage detector 4, which is in the form of a sine wave as shown at (a) of FIG. 3, is supplied via the operational amplifier 12 to the square wave-forming circuit 14, where it is converted into a square wave signal b as shown at (b) of FIG. 3, which is supplied to the invertor 18 as well as to the phase difference detector 16. An output current signal indicative of a detected output current from the power unit outputted from the current detector 5 is converted by the square wave-forming circuit 15 into a signal b', which is similar in waveform to the square wave signal b, and the signal b' is also supplied to the phase difference detector 16. The phase difference detector 16 supplies a phase difference voltage in response to the phase difference between the signals b and b' to the VCO 6 to control the frequency of the oscillation signal outputted therefrom.

The frequency-controlled oscillation signal from the VCO 6 is divided by the frequency divider 7 into a clock signal which is supplied to the sine wave-forming circuit 8. The sine wave-forming circuit 8 forms, by the use of the clock signal, a sine wave signal having a stepped waveform, which is supplied to the electronic attenuator 9. The electronic attenuator 9 controls stoppage and passage of the sine wave signal, as well as the degree of damping of same during passage, and the resulting sine wave signal thus controlled is supplied via the LPF 10 to the PWM 11, which in turn generates a pulse signal which has been pulse width-modulated by the sine wave signal. The LPF 10 shapes the sine wave signal having a stepped waveform into a sine wave signal having a smooth sinusoidal waveform. The pulse signal from the PWM 11 controls the duration of activation of gates of an invertor circuit of the invertor/LPF 3 so that the invertor circuit converts the DC power into a pulse train having a pulse width variable with the sine wave signal from the LPF 10, and an LPF of the invertor/LPF 3 forms the output from the invertor circuit into AC power having a smooth sinusoidal waveform, which is outputted from the output terminals T1, T1 via the voltage detector 4 and the current detector 5.

If the operation/stoppage control device 17 enters an operation mode, an output signal c from the control device 17 is changed from a low level (i.e. stoppage) to a high level, as shown at (c) in FIG. 3.

The D input terminal of the D flip flop 21 is supplied with the output signal c, the CK input terminal with a NAND signal d (as shown at (d) in FIG. 3) depending on a signal obtained by inverting the square wave signal b and the output signal c, and the R terminal with a signal f (as shown at (f) in FIG. 3) obtained by inverting the output signal c. The Q-bar output terminal of the D flip flop 21 generates a signal Q-bar (as shown at (e) in FIG. 3) depending on the above signals c, d, and f. The relationship between the signal Q-bar and the signals c, d, and f is shown in a table given below. In this table, symbol "↑" designates rise of the pulse signal d, symbol "↓" fall of same, and "s" indicates a signal on an S terminal of the D flip flop 21, which is constantly at a low level. Further, symbol "*" means that the signal level may be either low (L) or high (H) (don't care).

TABLE

| d | c | f | s | $Q_{n+1}$ |
| --- | --- | --- | --- | --- |
| ↑ | H | L | L | L |
| ↓ | H | L | L | $Q_n$ |
| * | L | H | L | H |

Let it now be assumed that the present power unit is connected in parallel with another power unit for parallel operation before starting the present power unit. If the other power unit supplies AC power voltage to output lines of the present power unit, and the stoppage/operation control device 17 enters the operation mode, the signal c is caused to go high. Accordingly, as shown in the second row of the table, the signal Q-bar goes low upon a first rise of the signal d (see (d) and (e) in FIG. 3) whereby the reset state of the sine wave-forming circuit 8 is cancelled to cause the target output waveform signal therefrom to be supplied to the electronic attenuator 9. Accordingly, the electronic attenuator 9 generates a signal having a selected target output waveform to permit the present power unit to supply, to the load, AC power which is substantially identical in phase of the waveform of the output power with the other power unit. However, when no AC power voltage is supplied from the other generator due to stoppage of the other power unit or disconnection therewith, the CK input terminal of the D flip flop 21 is not supplied with the pulse signal, and hence the Q-bar output terminal of same continues to be at an initially-set high level, whereby the sine wave-forming circuit 8 remains in a reset state in which it does not generate the target output waveform signal, preventing the present 15 power unit from supplying AC output to the load.

The counter 22 is provided for eliminating the above-mentioned inconvenience, i.e. it enables the portable power unit to start by itself. More specifically, if the operation/stoppage control device 17 enters the operation mode to cause the signal c to go high and hence the signal f to go low, the reset state of the counter 22 is cancelled, and after counting a predetermined number of clock pulses supplied from the frequency divider 7 and equivalent to a predetermined time period, the output from the output terminal Q6 of the counter 22 changes from a low level via a high level to a low level, so that the output signal from the invertor 23 changes from a high level via a low level to a high level. Accordingly, as can be understood from the table, the output signal Q-bar from the D flip flop 21 goes low to cancel the reset state of the sine wave-forming circuit 8, enabling the present power unit to generate AC power having a waveform based on the target output waveform signal from the sine wave-forming circuit 8.

Next, there will be described the output characteristic of the portable power unit in single operation which has been started as described above.

Figure 4:
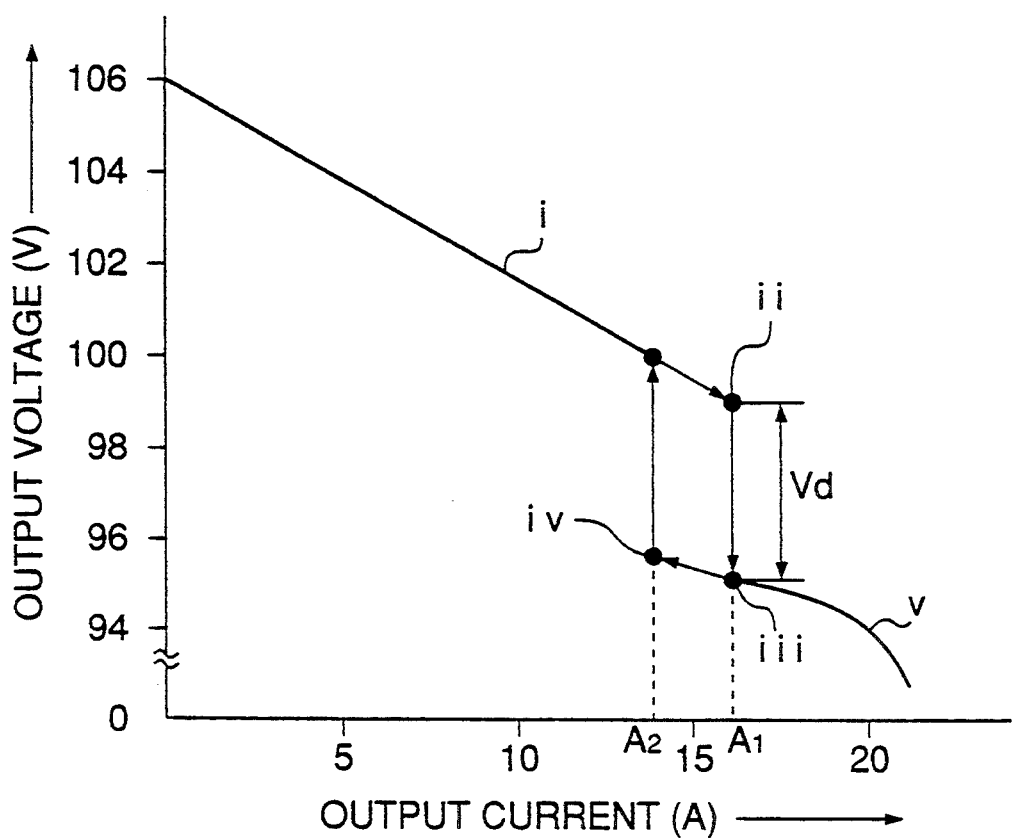
FIG. 4 is a graph showing an output current vs. output voltage characteristic of the power unit shown in FIG. 2, useful in explaining its operation.

As the output current increases, the output voltage progressively decreases in accordance with the output current vs. output voltage characteristic of the power unit per se as indicated by i in FIG. 4. When a value of output voltage from the current detector 5 indicative of the output current exceeds a second threshold value Vi2 ($A_2$, in terms of output current) referred to hereinafter, which corresponds to a limit of the range i, and subsequently reaches a first threshold value Vi1 ($A_1$ in terms of output current), indicated by a point ii in the figure, which is set in the comparator circuit 25, an output signal from the comparator circuit 25 causes the electronic attenuator 9 to operate, whereby the output voltage alone is caused to progressively decrease with the lapse of time until it reaches a value indicated by a point iii, which is the lower limit of the voltage-adjusting range. In this connection, in the present embodiment, the maximum value of the total voltage drop Vd is 4 V, and when the present power unit is in parallel operation with the other power unit, an amount of output current from the other power unit is adjusted by adjusting the output voltage from the present power unit to one from the other power unit, between the points ii and iii.

Once the output voltage has been decreased to the point iii, the output current vs. output voltage characteristic of the present power unit is shifted to a lower level corresponding to the point iii. When the output current decreases in accordance with the output current vs. output voltage characteristic shifted to the lower level, to a point iv in FIG. 4 which corresponds to the second threshold value Vi2 ($A_2$ in terms of output current) which is set in the comparator circuit 25, the output signal from the comparator circuit 25 causes the electronic attenuator 9 to operate inversely, whereby the output voltage progressively returns to the state of i FIG. 4.

In the case where the output current continues to increase in spite of the drop of the output voltage, the output power enters a state indicated by v in FIG. 4. When this state continues over a predetermined time period, i.e. if the output signal indicative of an overcurrent state of the power unit continues to be supplied from the comparator circuit 25 to the protective circuit 26 over the predetermined time period, the protective circuit 26 supplies an output signal to the operation/stoppage control device 17, from which a stoppage command signal is supplied to the PWM 11 to inhibit the invertor/LPF 3 from operating.

Figure 5:
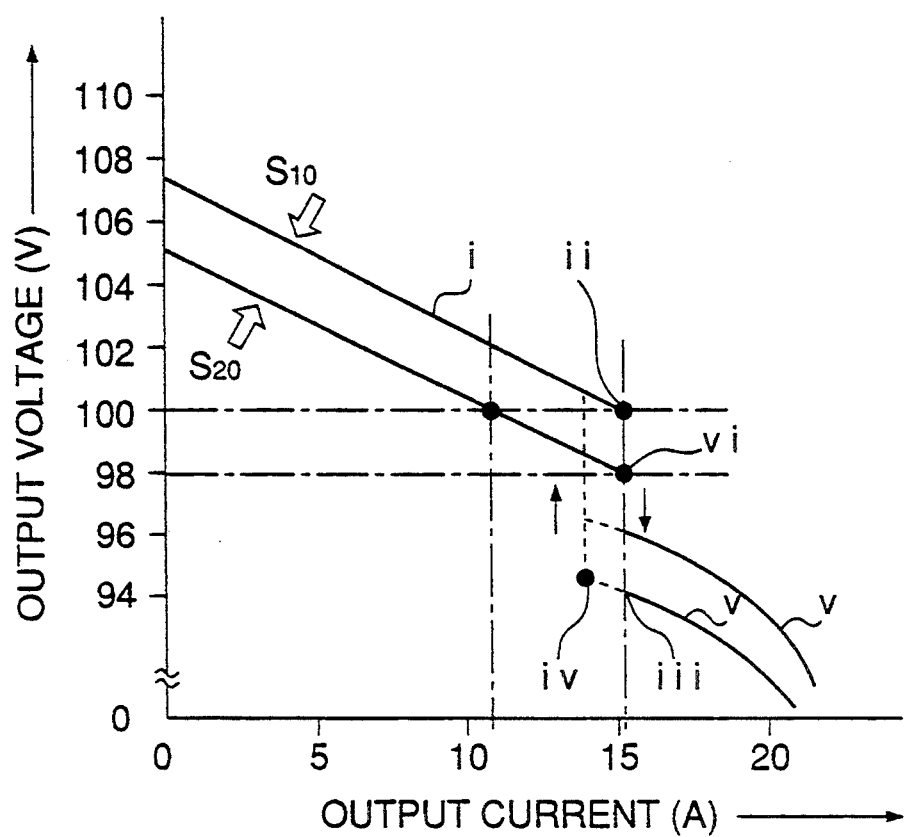
FIG. 5 is a graph showing an output current vs. output voltage characteristic of the power unit shown in FIG. 2, useful in explaining its operation when it is connected to another power unit for parallel operation.

In the case where the portable power unit according to the present embodiment is parallely connected with another power unit for parallel operation therewith, if the output current from the present power unit reaches the point ii corresponding to the first threshold value Vi1 earlier than the other power unit, the output voltage starts to decrease, as shown in FIG. 5. This decrease in the output voltage from the present power unit causes the other power unit to start to supply a greater amount of electric current to the load device, i.e. with the output current from the present power unit being held at the value $A_1$ corresponding to the first threshold value Vi1 of the comparator circuit 25, the output current from the other power unit alone, which has been supplying a smaller amount of current than the value $A_1$ reached by the present power unit, progressively increases as the output voltage from the present power unit decreases, until the voltage is decreased to such an extent as will reach a point vi in FIG. 5, whereupon the sum of the maximum output currents from the power units is obtained as the total output current from the power units in parallel operation. Thus, the maximum total output power from the power units can be obtained while the output current is within a range within which the protective circuit 26 does not operate.

Next, various component parts of the power unit appearing in FIG. 2 will be described in detail with reference to FIGS. 6 et seq.

FIGS. 6 to 18 show the circuit arrangements of the component parts and circuits associated therewith. In FIGS. 6 and 7, reference numerals 1a and 1b designate respectively a three-phase output winding and a single-phase auxiliary winding wound on a common stator core, not shown, of the AC generator 1, separately from each other. A magnet rotor, not shown, having a plurality of magnetic poles is arranged to be rotatively driven by an engine, not shown. The three-phase output winding 1a has its output connected to a bridge rectifier 2a comprised of three thyristors and three diodes, which in turn has its output connected to a smoothing circuit 2b. The bridge rectifier 2a and the smoothing circuit 2b cooperatively form the rectifying/smoothing circuit 2.

The single-phase auxiliary winding 1b has its output connected to a constant-voltage regulator circuit A1 having positive and negative output terminals E and F. The constant-voltage regulator circuit A1 has two sets of rectifiers, smoothing circuits, and constant-voltage regulators A1a, one set being operable in response to current flowing in one direction from the auxiliary winding 1b, the other set in response to current flowing in the other direction so that the output terminals E, F supply positive constant voltage and negative constant voltage, respectively.

Reference numeral A2 designates a thyristor control circuit which has a power source-input terminal connected to the positive output terminal E of the constant-voltage regulator circuit A1, and another terminal grounded together with a positive terminal of the smoothing circuit 2b. The thyristor control circuit A2 has a signal-input terminal formed of a series circuit of a capacitor C1, and resistances R1 to R3. One end of the series circuit on the capacitor C1 side is connected to the positive output terminal E of the constant-voltage regulator circuit A1, while the other end of the series circuit on the resistance R3 side is connected to a negative terminal of the smoothing circuit 2b. The junction between the resistances R1 and R2 is connected to a base of a transistor Q1, which has a collector connected to a base of a transistor Q2. The transistor Q2 in turn has a collector connected to gate input circuits of the thyristors of the bridge rectifier 2a. The thyristor control circuit 6, which is arranged as above, controls input signals to the gate input circuits according to a potential at the junction between the resistances R1 and R2.

The junction K between the capacitor C1 and the resistance R1 is connected to the output of the operation/stoppage control device 17. The operation/stoppage control device 17 has a Zener diode D1, which has a cathode connected to an input terminal G of the constant-voltage regulator A1a provided on the positive output terminal E side of the constant-voltage regulator circuit A1, and an anode connected to the negative output terminal F of the constant-voltage regulator circuit A1 as well as to an inverting input terminal of an inverting comparator 171 formed of an operational amplifier, via resistances. The inverting comparator 171 has a non-inverting input terminal grounded via a resistance. The output of the inverting comparator 171 is connected to one input terminal of a NOR circuit 172, which has the other input terminal connected to a protective device 26 comprised of a counter, not shown, etc. for detecting an overcurrent state of the power unit. The protective device 26 supplies a high level signal to the NOR circuit 172 when the counter has counted up a predetermined number of pulses. The output of the NOR circuit 172 is connected via an invertor 173 and a resistance to a base of a transistor Q3. The transistor Q3 has an emitter connected to the negative output terminal F of the constant-voltage regulator circuit A1, and a collector connected to the positive output terminal E of the constant-voltage regulator circuit A1 via a resistance R4 and to the negative output terminal F of the constant-voltage regulator circuit A1 via a capacitor C2. The capacitor C2 has a positive terminal connected to a base of a transistor Q4, which in turn has a collector connected to the positive output terminal E of the constant-voltage regulator circuit A1 and an emitter connected to an anode of a diode D2 and the junction K between the capacitor C1 and the resistance R1 of the thyristor control circuit A2. The diode D2 has a cathode connected to the positive terminal of the capacitor C2. The output of the NOR circuit 172 is also connected to the NAND circuit 19 in FIG. 2, the D input terminal of the D flip flop 21, the input of the invertor 20, and a control terminal of the PWM 11.

Figure 8:
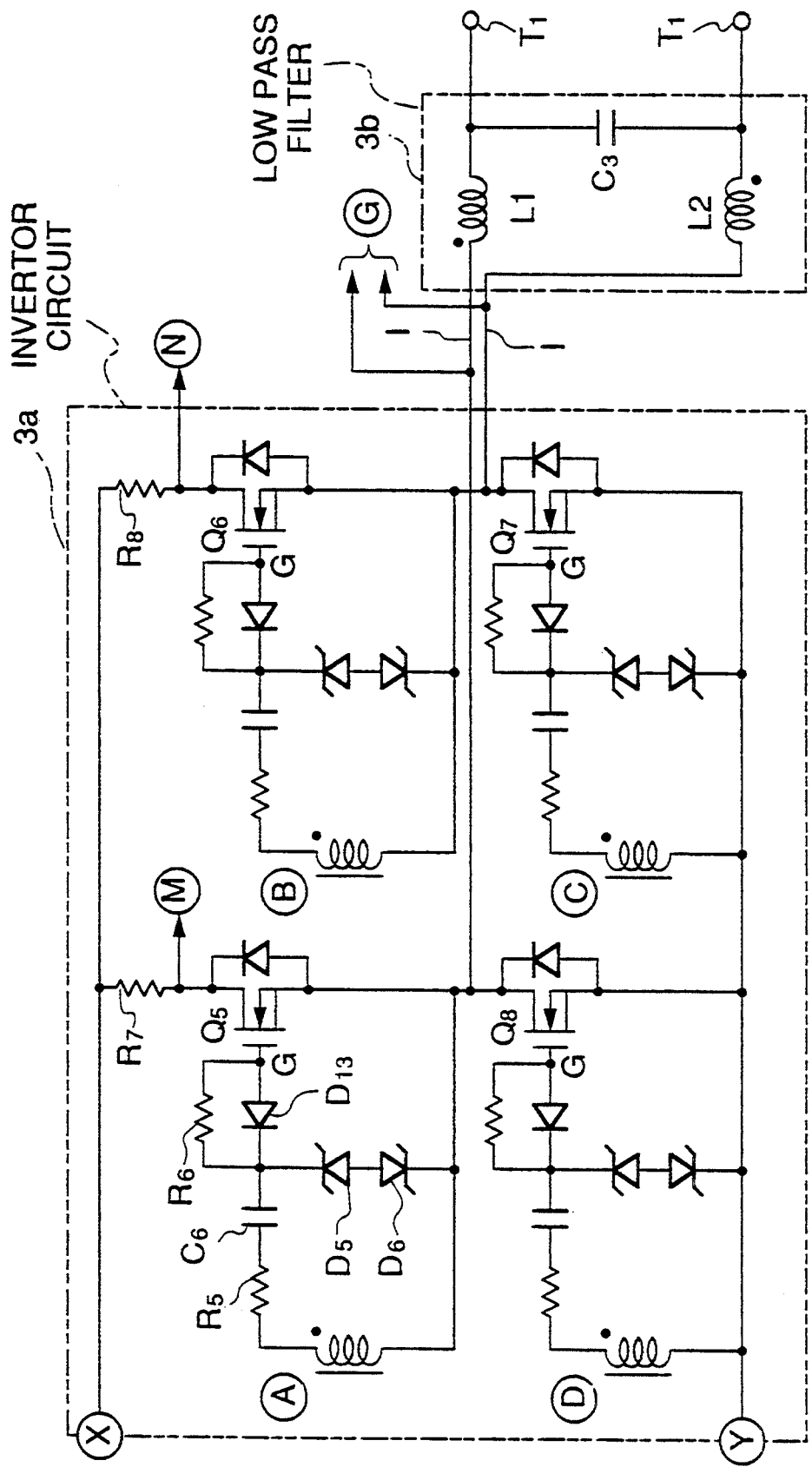
FIG. 8 is a circuit diagram showing details of an invertor circuit, and its related components of the portable power unit shown in FIG. 2.

The smoothing circuit 2b has its output connected to the invertor circuit (switching means) 3a, shown in FIG. 8, of the invertor/LPF 3. The invertor circuit 3a is formed by a bridge circuit composed of four FET's Q5-Q8 as switching elements which have their gates connected to FET gate-driving signal circuits, hereinafter referred to.

The output of the invertor circuit 3a is connected via the low-pass filter (LPF) 3b of the invertor/LPF 3 to output terminals T1, T1, which are connected to a load, not shown. The LPF 3b is formed of coils L1 and L2 connected in series to the load, and a capacitor C3 connected in parallel with the load.

Figure 9A:
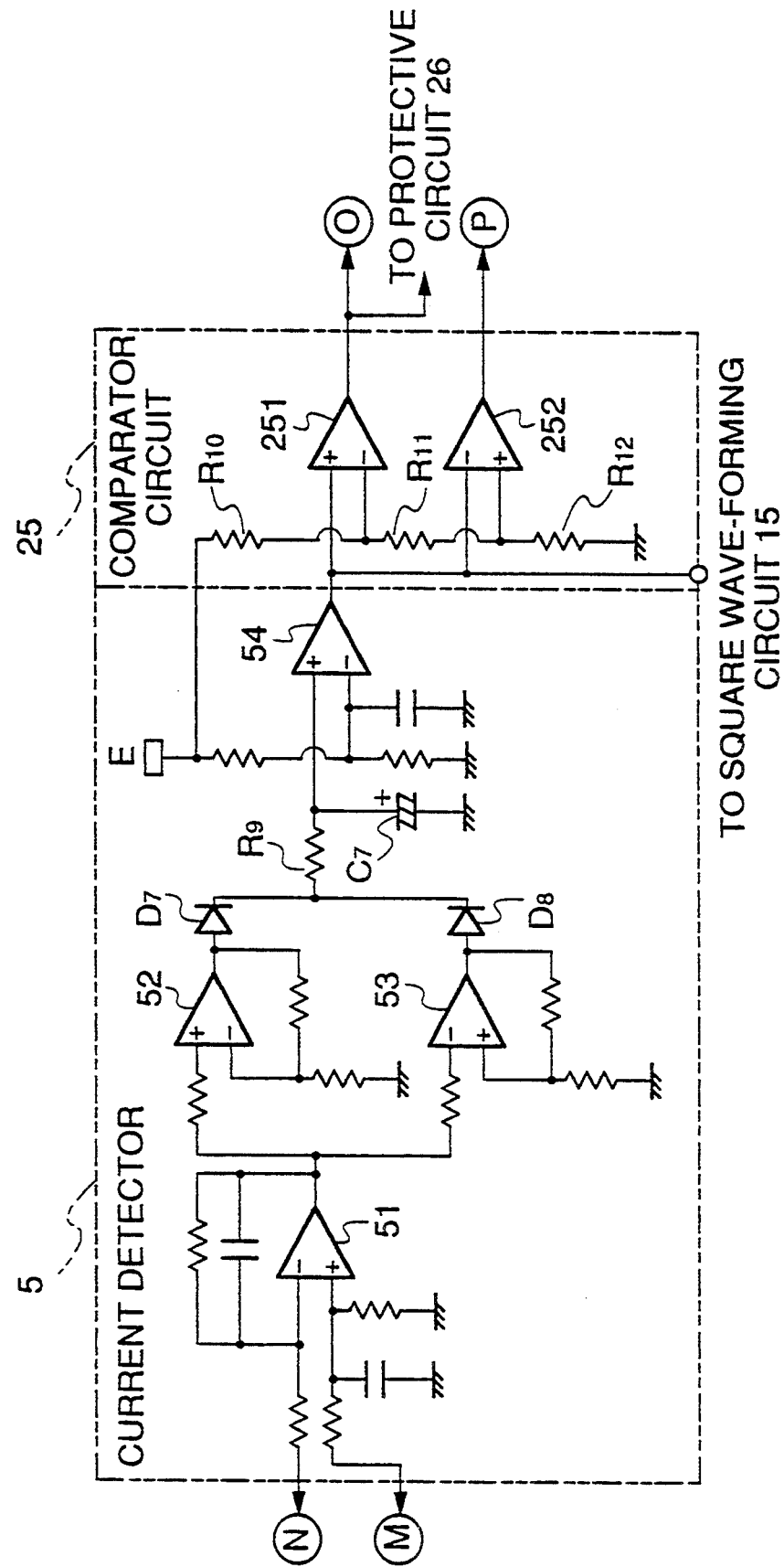
FIG. 9a is a circuit diagram showing an example of a current detector and a comparator circuit appearing in FIG. 2.
Figure 9B:
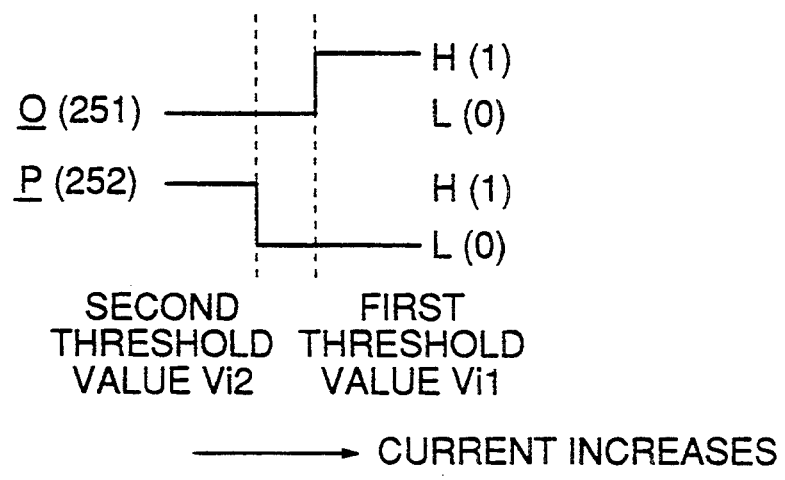
FIG. 9b is a graph showing logical levels of outputs from the comparator circuit depicted in relation to threshold values.

Current-detecting resistances R7, R8 are connected between respective drains of the FET's Q5 and Q6 and a positive output line of the smoothing circuit 2b. The junctions M, N of the respective current-detecting resistances R7, R8 with the FET's Q5, Q6 are connected to the current detector 5, details of which are shown in FIG. 9. The current detector 5 is comprised of an operational amplifier 51 for inverting an input signal supplied from the junction N, adding the inverted signal to an input signal supplied from the junction M, and simultaneously amplifying the composite signal to form a sinusoidal wave signal, operational amplifiers 52, 53 and diodes D7, D8 for subjecting the sinusoidal wave signal to full-wave rectification, a resistance 9 and a capacitor C7 for smoothing an output signal from the diodes D7, D8, and an operational amplifier 54 for amplifying the resulting smooth signal outputted from the resistance R9 and the capacitor C7.

The output of the current detector 5 is connected to the input of the square wave-forming circuit 15 as well as to the input of the comparator circuit 25.

The comparator circuit 25 is comprised of two comparators 251, 252, and a series circuit formed between three serially-connected resistances R10, R11, R12, with one end thereof connected to the positive output terminal E of the constant-voltage regulator circuit A1 and the other end thereof grounded. The junction between the resistances R10 and R11 is connected to an inverting input terminal of the comparator 251 to provide the aforementioned first threshold value Vi1, whereas the junction of the resistances R11 and R12 is connected to a non-inverting input terminal of the comparator 252 to provide the aforementioned second threshold value Vi2. The output of the current detector 5 is connected to a non-inverting input terminal of the comparator 251 and an inverting input terminal of the comparator 252.

A portion of an electric current flowing through the FET Q5 of the invertor circuit 3a and supplied from the junction M and a portion of an electric current flowing through the FET Q6 of same and supplied from the junction N are inverted and superposed by the operational amplifier 51 to form the aforementioned sinusoidal wave signal of voltage having a sinusoidal waveform. This voltage signal from the operational amplifier 51 has its positive half-wave rectified by the operational amplifier 52 and the diode D7 and its negative half-wave rectified by the operational amplifier 53 and the diode D8, followed by being smoothed by the resistance R9 and the capacitor C7 to form a positive DC voltage. The DC voltage is DC-amplified by the operational amplifier 54 and subsequently supplied to the comparator circuit 25.

Potential at an output terminal P of the comparator 252 of the comparator circuit 25 goes high only when the output voltage from the current detector 5 is lower than the second threshold value Vi2, and potential at an output terminal O of the comparator 251 goes high only when the output voltage from the current detector 5 is higher than the first threshold value Vi1 which is higher than the second threshold value Vi2.

The output terminals O, P of the comparator circuit 25 are connected to control input terminals of the electronic attenuator 9.

Figure 10:
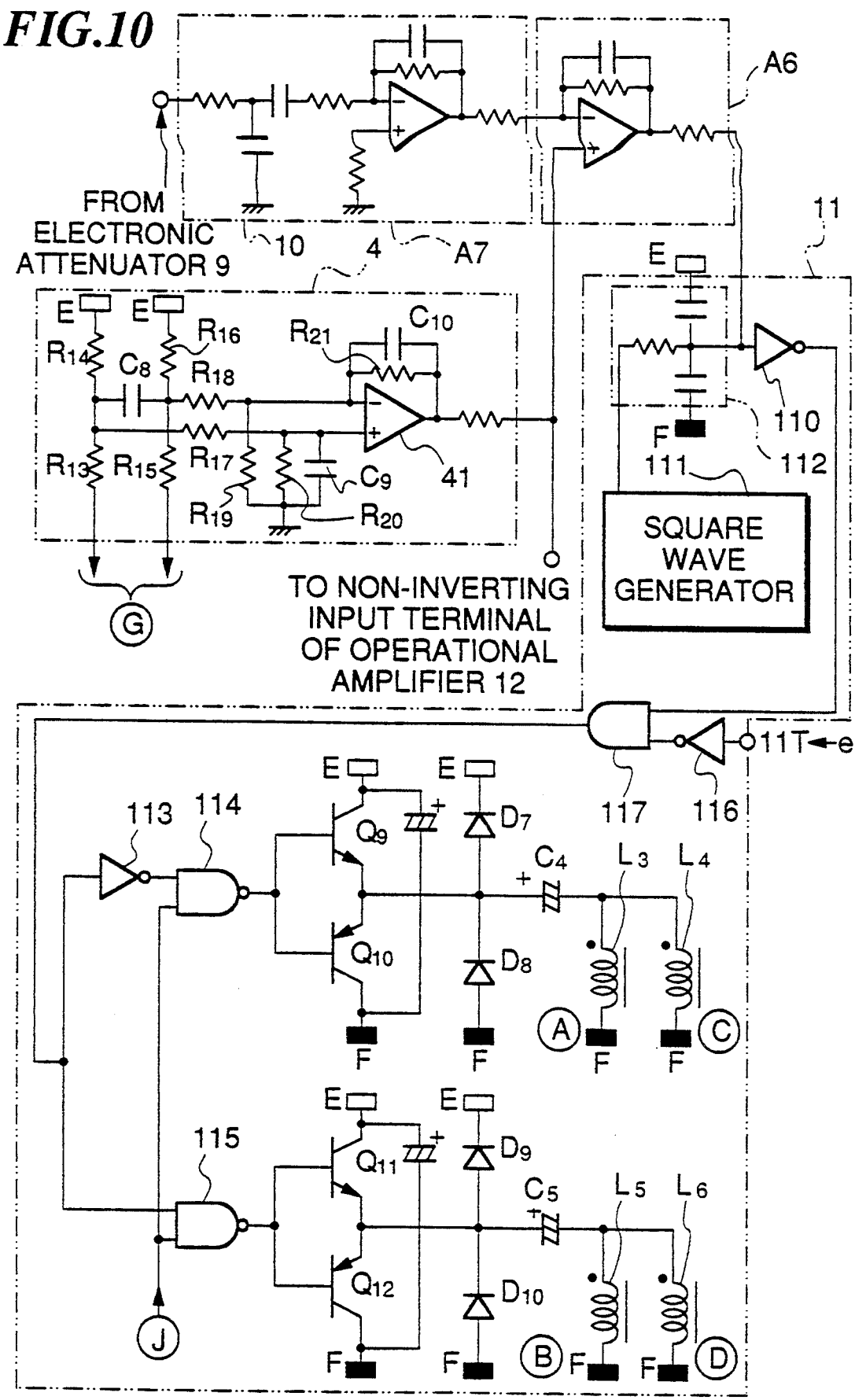
FIG. 10 is a circuit diagram showing details of an LPF and a PWM, and their related components of the portable power unit shown in FIG. 2.

A pair of output lines l, l from the invertor circuit 3a are connected to input terminals G of the voltage detector 4, details of which are shown in FIG. 10. The input terminals G are connected to one end of a series circuit of resistances R13 and R14 and one end of a series circuit of resistances R15 and R16, respectively. The other ends of these series circuits of resistances are connected to the positive output terminal E of the constant-voltage regulator circuit 5. The junction between the resistances R13 and R14 and the junction between the resistances R15 and R16 are connected via resistances R17, R18 to a non-inverting input terminal and an inverting input terminal of an operational amplifier 41, respectively, with a capacitor C8 for removing high frequency components connected between the two junctions. The non-inverting input terminal of the operational amplifier 41 is grounded via a capacitor C9 for removing high frequency components. The output of the operational amplifier 41 is connected via a resistance to a non-inverting input terminal of an operational amplifier of a distortion correcting circuit A6 as well as to the non-inverting input terminal of the operational amplifier 12.

An output voltage appearing at one of the output lines 1, 1 from the invertor circuit 3a and an output voltage appearing at the other output line 1 (these output voltages have waveforms similar to that of a PWM signal outputted from the PWM 11) are transmitted through the voltage-dividing resistances R13, R14 and R15, R16 to the junction between the capacitor C8 and the resistance R17 and the junction between the capacitor C8 and the resistance R18, where they appear as respective signals having their carrier frequency components of the PWM signal removed by the capacitor 8, i.e. AC signals similar to the output voltages appearing at the output terminals T1, T1. The two AC signals are compared at the operational amplifier 41 to form an AC signal containing distortions in the waveform of the power unit output voltage or offset components (i.e. an AC signal having an average level commensurate with the distortions in the output waveform and offset components), and the AC signal is supplied to the distortion correcting circuit AC.

In FIG. 10, reference numerals 10 and 11 designate the LPF and the PWM, respectively. The output of the electronic attenuator 9 is connected to an inverting input terminal of an operational amplifier of the LPF 10. The LPF 10 shapes a stepped sine wave from the electronic attenuator 9 into a smooth sine wave. The output of the LPF 10 is connected to an inverting input terminal of the operational amplifier of the distortion correcting circuit A6. The non-inverting input terminal of this operational amplifier is connected to the output of the voltage detector 4, as described hereinbefore. The distortion correcting circuit A6 corrects the level of the sine wave inputted via the LPF 10 from the electronic attenuator 9 based on an output signal from the voltage detector 4, and generates a corrected sine wave signal.

In FIG. 10, reference numeral 111 designates a square wave generator which generates a square wave having a frequency by far higher than the frequency of the sine wave outputted from the LPF 10. The output of the square wave generator 111 is connected to an integrating circuit 112, which integrates the square wave into a triangular wave signal.

The sine wave signal from the LPF 10, which has been corrected by the distortion correcting circuit A6, and the triangular wave signal from the integrating circuit 112 are superposed upon each other and the superposed signal is then supplied to an invertor buffer (pulse width modulating circuit) 110. The invertor buffer 110 is formed by an amplifier with a predetermined fixed threshold level which operates such that when a signal having a level exceeding the threshold level is inputted, it supplies an amplified low level signal, while when a signal having a level below the threshold value is inputted, it supplies an amplified high level signal, thus forming the aforementioned PWM signal (the pulse width modulated signal). The invertor buffer 110 may be formed by an IC having a fixed threshold level relative to its gate input level, e.g. a threshold level of a CMOS gate on the input terminal side.

The output of the invertor buffer 110 is connected to one input terminal of an AND circuit 117 which has the other input terminal thereof supplied with the output (i.e. the signal Q-bar) from the Q-bar output terminal of the D flip flop 21 via an invertor 116. The invertor 116 and the AND circuit 117 cooperate to form a gate circuit for the PWM signal. When the signal Q-bar from the D flip flop 21 goes low, the gate opens. In other words, the PWM signal starts to be outputted from the gate circuit at a time point of fall of the signal Q-bar, i.e. at a time point the AC output voltage upwardly crosses a zero level. The output of the AND circuit 117 is connected via an invertor 113 to one input terminal of a NAND circuit 114 and on the other hand directly connected to one input terminal of a NAND circuit 115. The NAND circuits 114 and 115 have their other input terminals connected to the output terminal J of the NOR circuit 172 of the operation/stoppage control device 17.

The output of the NAND circuit 114 is connected to a first push-pull amplifier composed of transistors Q9 and Q10. The transistor Q9 of the first push-pull amplifier has its collector connected to the positive output terminal E of the constant-voltage regulator circuit A1, and the transistor Q10 has its collector connected to the negative output terminal F of the constant-voltage regulator circuit A1.

The output of the first push-pull amplifier, i.e. the junction between emitters of the transistors Q9, Q10 is connected to the junction between an anode of a diode D7 and a cathode of a diode D8. The diode D7 has its cathode connected to the positive output terminal E of the constant-voltage regulator circuit A1, while the diode D8 has its anode connected to the negative output terminal F of the regulator circuit A1. The diodes D7, D8 cooperate to damp surging occurring at pulse transformers, hereinafter referred to.

The junction between the anode of the diode D7 and the cathode of the diode D8 is connected to ends of primary coils L3 and L4 of pulse transformers A, C via a capacitor C4 for cutting off low frequency components. The other ends of the primary coils L3, L4 are connected to the negative output terminal F of the constant-voltage regulator circuit A1. Before passing the capacitor C4, the PWM signal has constant amplitude with respect to the reference level but the average voltage (integrated value) of this signal varies with the same period as the sine wave signal from the LPF 10. Therefore, this PWM signal contains a component of the same frequency as that of the sine wave signal. The capacity C4 is set to such a constant that the PWM signal, by passing the capacitor C4, is converted into a pulse train which varies as a whole in reverse phase to the component of the same frequency as that of the sine wave and always has a zero average voltage. This pulse train always having a zero average voltage is applied to the primary coils L3, L4 of the pulse transformers A, C.

The output of the NAND circuit 115 is connected to a second push-pull amplifier composed of transistors Q11 and Q12 like the first push-pull amplifier. The output of the second push-pull amplifier is connected to the junction between an anode of a diode D9 and a cathode of a diode D10. This junction is also connected to ends of primary coils L5 and L6 of pulse transformers B and D via a capacitor C5 which has the same constant as the capacitor C4.

Referring again to FIG. 8, the driving signal circuit which is connected to gates of the FET's Q5-Q8 will be described. One end of the secondary coil of the pulse transformer A is connected to a gate of the FET Q5 via a series circuit formed by a damping resistance R5, and a capacitor C6 for reproducing the PWM signal before passing the capacitor C4, and a parallel circuit formed by a resistance R6 and a diode D13, while the other end of the secondary coil of the pulse transformer A is connected to a source of the FET Q5. The junction between the capacitor C6 and the parallel circuit formed by the resistance R6 and the diode D13 is connected to the above other end of the secondary coil of the pulse transformer A via a series circuit formed by Zener diodes D5 and D6. The diode D13 has its anode connected to the gate of the FET Q5, and the Zener diodes D5, D6 have their anodes connected with each other.

Provided between a secondary coil of each of the pulse transformers B, C and D and a gate of a corresponding one of the FET's Q6–Q8 is the same circuitry as the above described one provided between the secondary coil of the pulse transformer A and the gate of the FET Q5.

Figure 11:
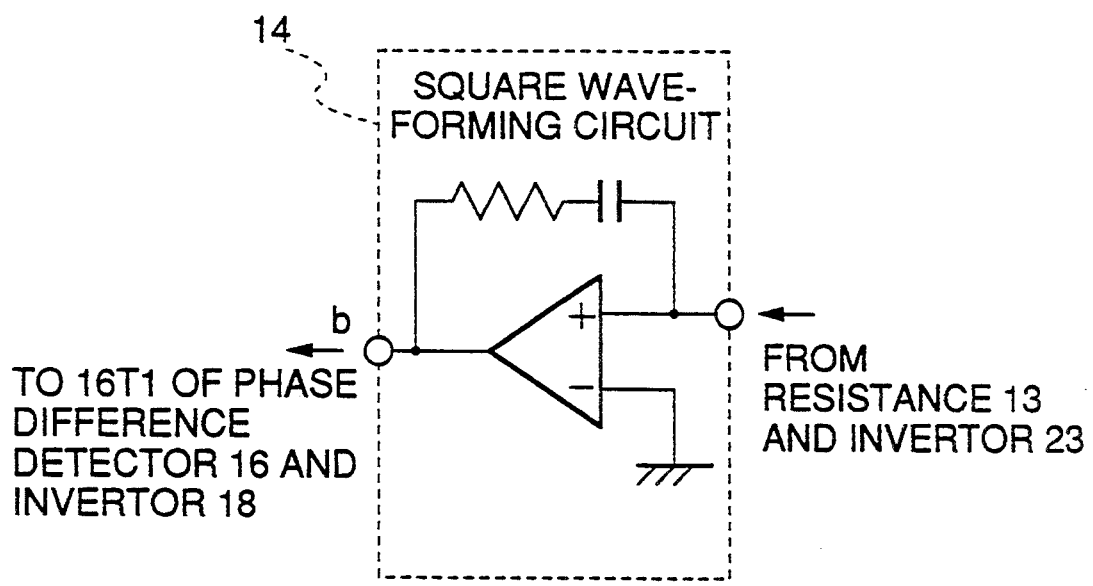
FIG. 11 is a circuit diagram showing an example of a square wave-forming circuit appearing in FIG. 2.

FIG. 11 shows, by way of example, details of the square wave-forming circuit 14 for converting the AC output voltage signal into the square wave signal b. This circuit is a positive feedback amplifier circuit using an operational amplifier. The signal having a sinusoidal waveform and corresponding in phase to the AC output voltage signal is supplied from the voltage detector 4 via the operational amplifier 12 to the square wave-forming circuit 14, where it is amplified in a positive feedback manner into the square wave signal b having a steep rise/fall characteristic.

Figure 12:
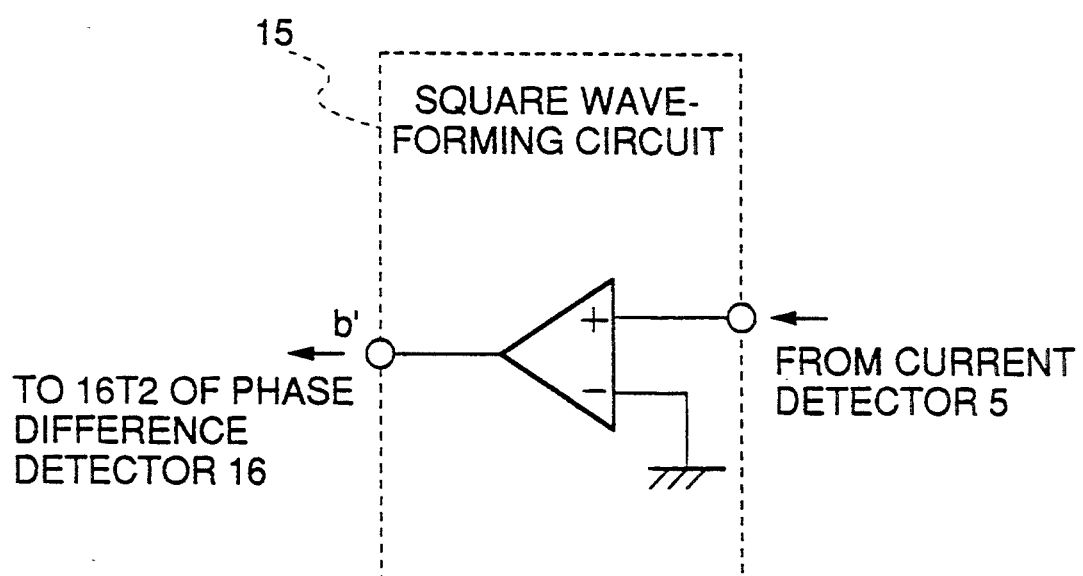
FIG. 12 is a circuit diagram showing an example of another square wave-forming circuit appearing in FIG. 2.

FIG. 12 shows, by way of an example, details of the square wave-forming circuit 15 for converting the AC output current signal into the square wave signal b'. This circuit is a high gain amplifier circuit using an operational amplifier. The square wave-forming circuit 15 is supplied with the output current signal having a sinusoidal waveform and corresponding in phase to the phase of the load current from the current detector 5, and converts same into the square wave signal b' having a steep rise/fall characteristic.

Figure 13:
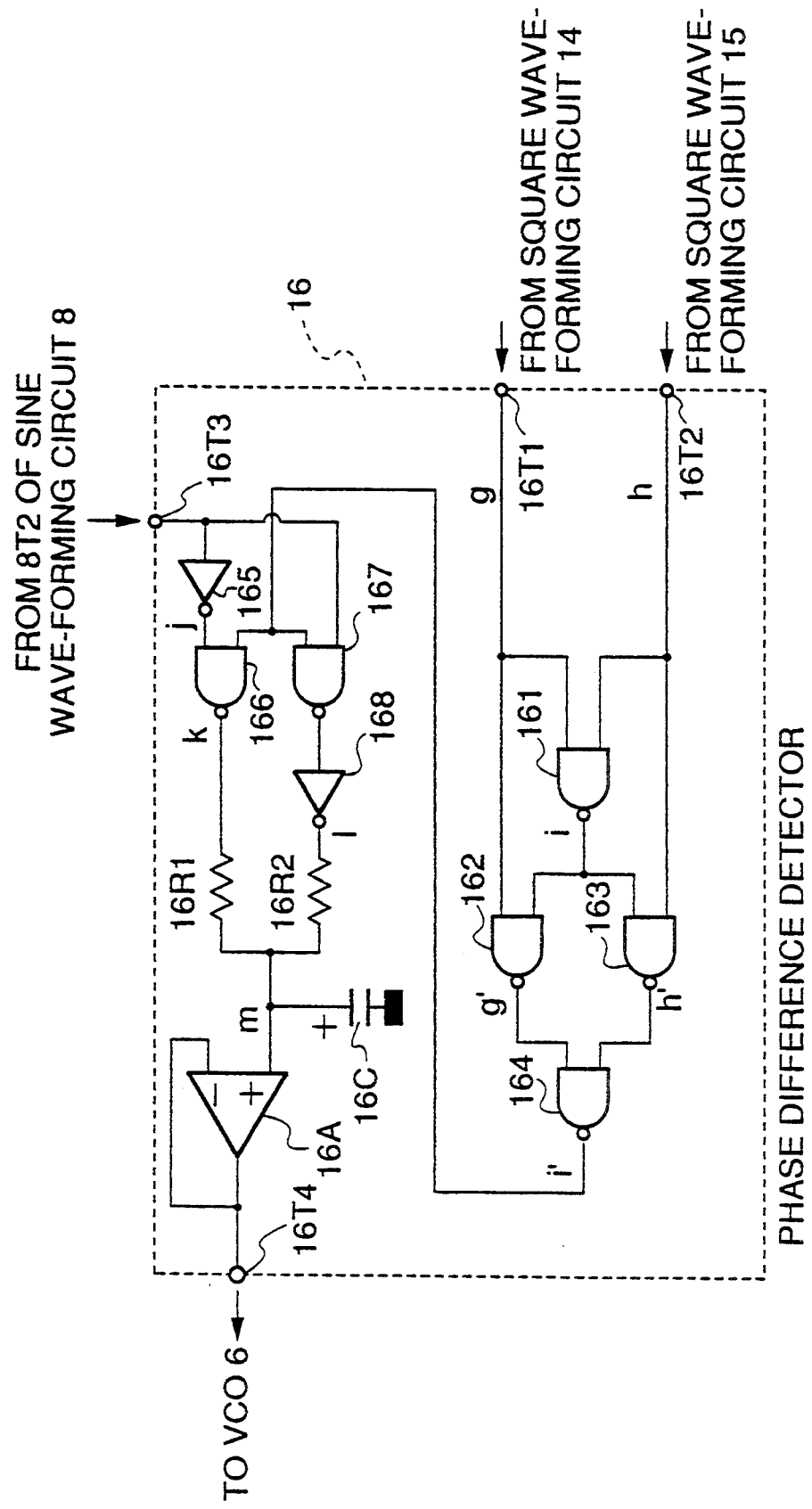
FIG. 13 is a circuit diagram showing an example of a phase difference detector appearing in FIG. 2.

FIG. 13 shows, by way of example, details of the phase difference detector 16. The operation of the phase difference detector 16 will be described with reference to FIG. 14. The square wave signal g (as shown at (a) in FIG. 14) from the square wave-forming circuit 14, which represents the phase of the AC output voltage, and the square wave signal h (as shown at (b) of FIG. 14) from the square wave-forming circuit 15, which represents the phase of the AC output current, are supplied via respective input terminals 16T1, 16T2 to a NAND circuit 161, which in turn supplies a NAND signal i (as shown at (c) in FIG. 14). The signals i and g are supplied to a NAND circuit 162, which in turn supplies a NAND signal g' (as shown at (d) in FIG. 14), whereas the signals i and h are supplied to a NAND circuit 163, which in turn supplies a NAND signal h' (as shown at (e) in FIG. 14). The signals g' and h' are supplied to a NAND circuit 164, which in turn supplies a NAND signal i' (as shown at (f) in FIG. 14). As can be understood from (a), (b), and (f) in FIG. 14, the NAND signal i' has a pulse width corresponding to the phase difference between the AC output voltage and current. The pulse signal i' rises at both a leading edge and a trailing edge of the square wave signal g having a relatively advanced phase.

Figure 14:
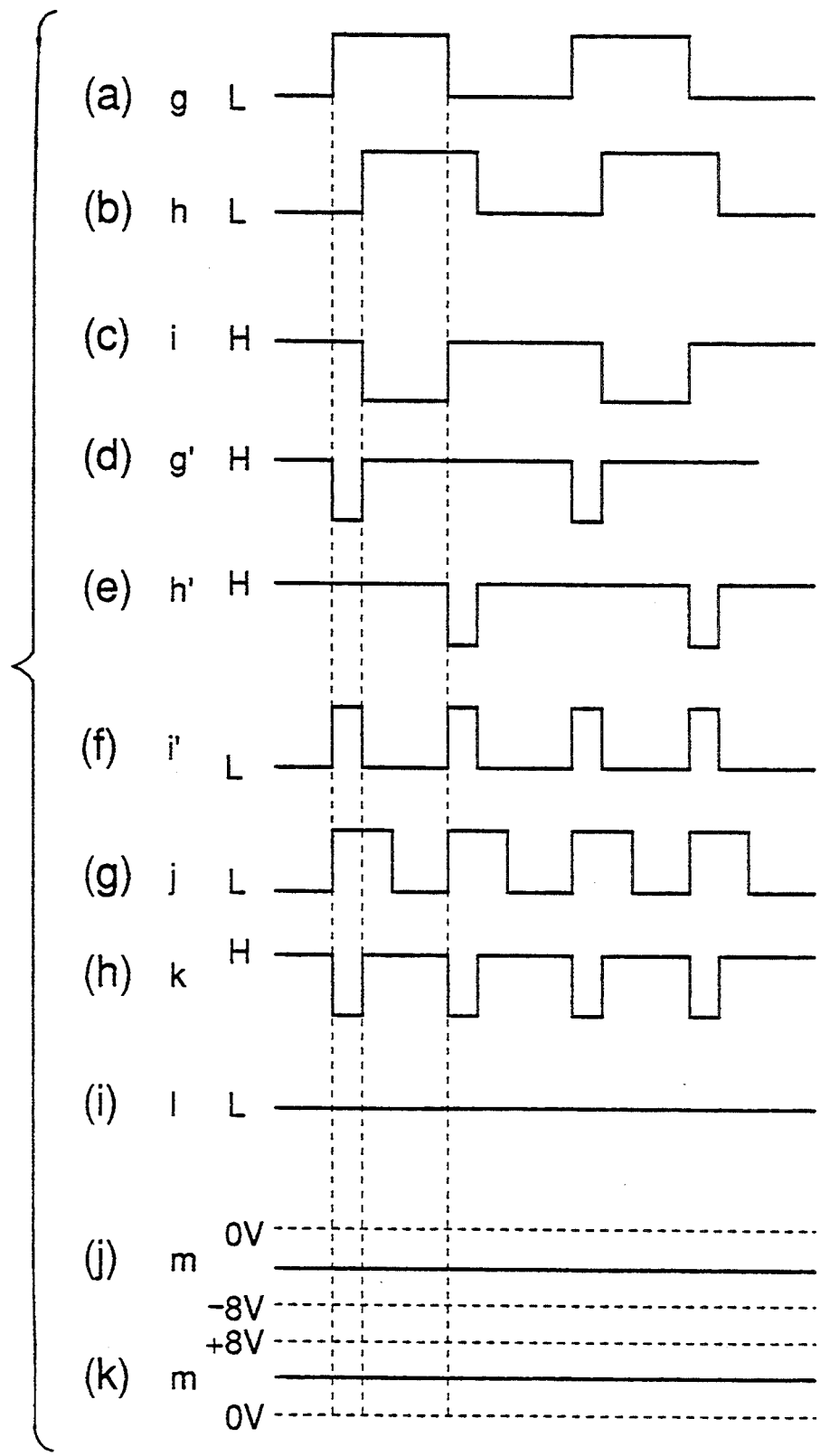
FIG. 14 is a timing chart useful in explaining the operation of the phase difference detector of FIG. 13.

Invertors 165, 168, NAND circuits 166, 167, a capacitor 16C, and resistances 16R1, 16R2 cooperate to form a phase difference-to-voltage convertor for generating voltage corresponding to the phase difference between the AC output voltage and current. A signal j (as shown at (g) in FIG. 14) is outputted from an invertor 165 which inverts a pulse signal supplied from the sine wave-forming circuit 8 via an input terminal 16T3. The signal j, which indicates the phase of the oscillation signal outputted from the VCO 6, has a frequency equivalent to a period half as large as the period of the target output waveform signal and is obtained by dividing each half cycle of the target output waveform signal into a first half and a second half to use them for determining whether the phase difference signal i indicates an AC output voltage having an advanced phase or one having a retarded phase relative to the AC output current. Further, the signal j determines a time period for opening the gate for the signal i. In FIG. 13, while the signal j assumes a high level, the signal i' is allowed to be outputted as a signal k from the NAND circuit 166. While the signal j assumes a low level, the signal i' is allowed to be outputted from the NAND circuit 167. However, while the signal j assumes a low level, the signal i' assumes a low level, so that the output from the NAND circuit 167 and hence an output signal l from the invertor 168 remains unchanged. More specifically, as shown at (h) and (i) in FIG. 14, whenever the signal i' goes low, the signal k goes high, whereas the signal l remains low. Here, the high level of a signal means 8 V, and the low level of same means −8 V. Therefore, when the signal k assumes a high level and the signal l assumes a low level, the two voltages of 8 V and −8 V cancel each other to form a signal m (as shown at (j) in FIG. 14) having 0 V. When the signal k goes low, both the signals k and l assume low levels, so that discharge of electricity from the capacitor 16c toward −8 V occurs, and then when the signal k goes high, charge of electricity toward 0 V occurs as shown in the figure. After all, the average voltage varies within a range of 0 V to −8 V. In this connection, the timing shown at (j) of FIG. 14 shows an example in which the output current has a retarded phase relative to the output voltage. However, when the output current has an advanced phase relative to the output voltage, the average voltage varies between 0 V and +8 V. Further, taking into account the fact that the signal j has a frequency equivalent to half the period of the output target waveform, the voltage varies within a range of −4 V to +4 V in response to the phase difference. The voltage corresponding to the phase difference is supplied via the output terminal 16T4 to the VCO 6.

Figure 15:
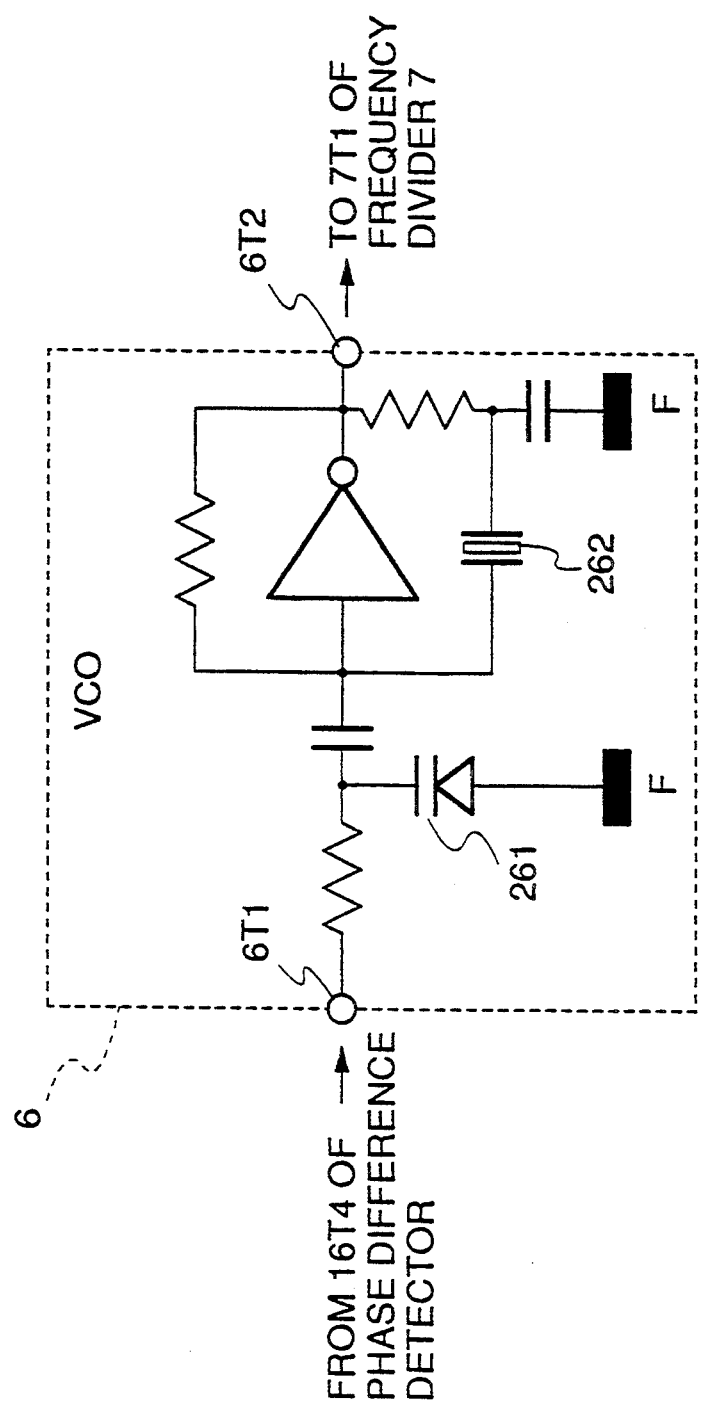
FIG. 15 is a circuit diagram showing an example of a VCO appearing in FIG. 2.

FIG. 15 shows, by way of example, details of the VCO 6 for controlling the oscillation frequency by means of a varactor diode 261. More specifically, it utilizes the fact that if reverse bias voltage applied to the varactor diode is increased, its junction capacity decreases. For example, it can increase the frequency by increasing the reverse bias voltage, which enables to increase the frequency when the voltage of the AC output has an advanced phase relative to that of the current of same, and decrease the frequency when the former has a retarded phase relative to that of the latter. The VCO 6 is supplied with voltage corresponding to the phase difference from the phase difference detector 16 via an input terminal 6T1, and supplies an oscillation signal having a frequency corresponding to the voltage via an output terminal 6T2. If a crystal resonator 262 is used in the VCO 6, the frequency is stable but can be varied by a combination capacity controlled by such a varactor diode 261 within a range of approx. +0.01%.

Figure 16:
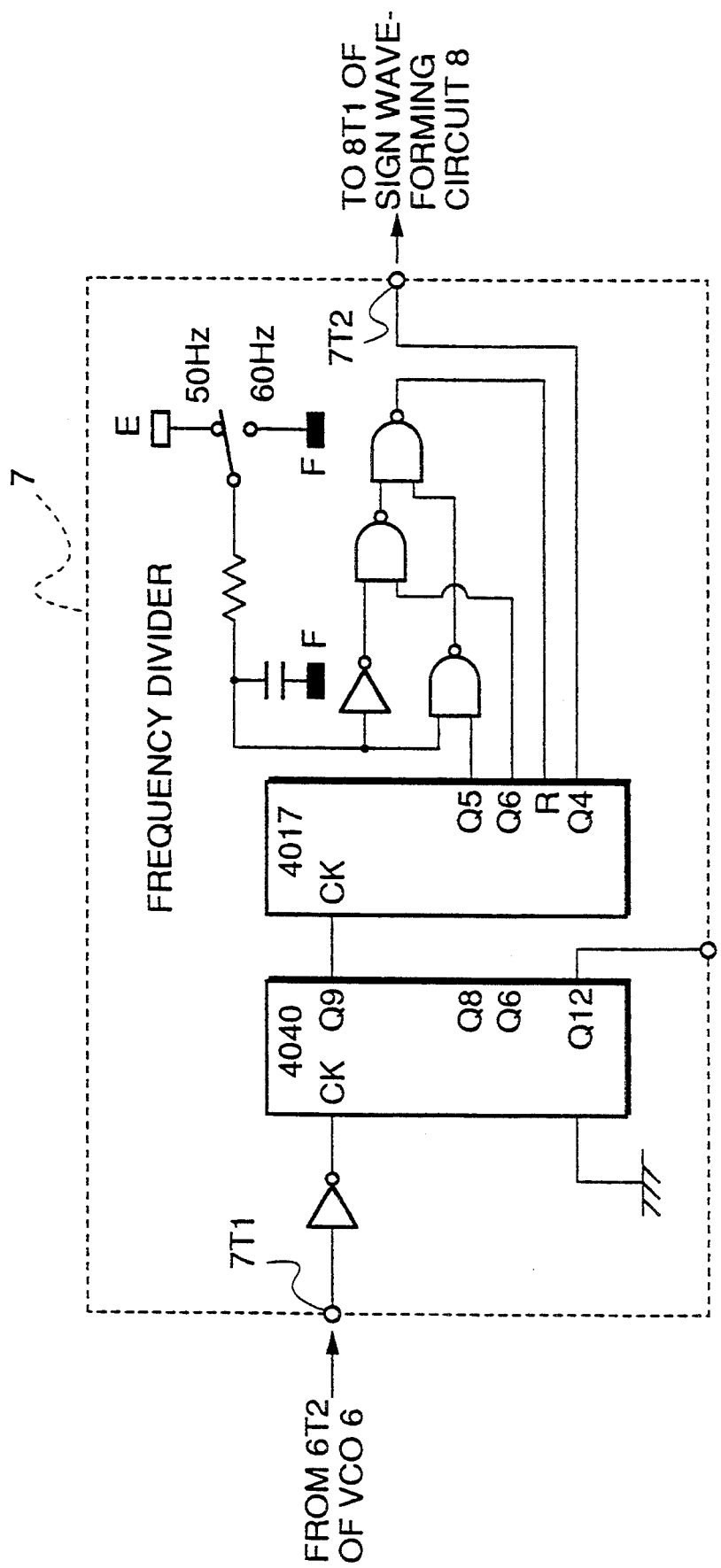
FIG. 16 is a circuit diagram of an example of a frequency divider appearing in FIG. 2.

FIG. 16 shows, by way of example, details of the frequency divider 7, which is formed e.g. by counters such as μP74HC 4040, μP74HC 4017 manufactured and sold by NEC Corporation, etc. The frequency divider 7 has an input terminal 7T1 supplied with the oscillation signal from the VCO 6, and an output terminal 7T2 which outputs a frequency-divided signal obtained by dividing the oscillation signal.

Figure 17:
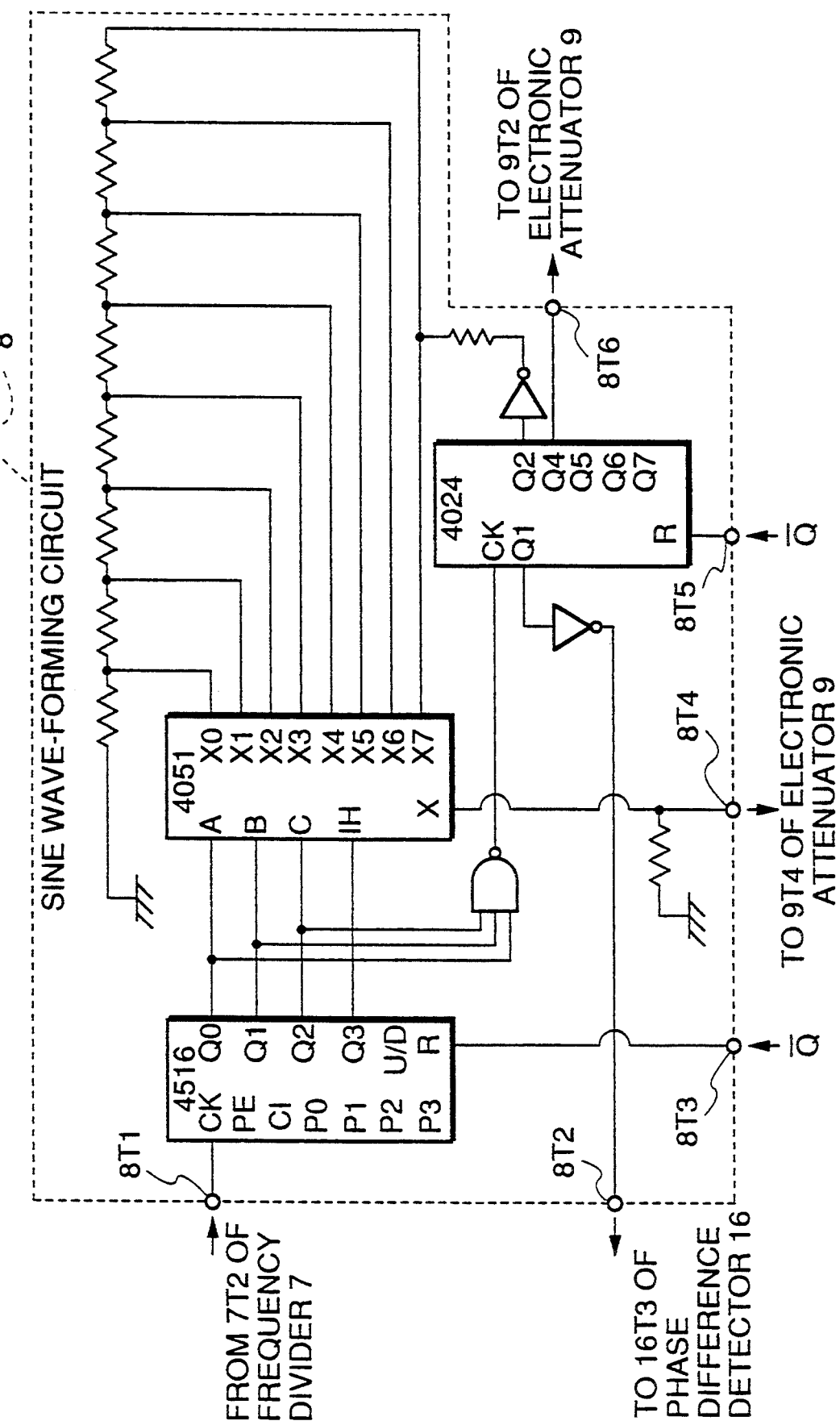
FIG. 17 is a circuit diagram showing an example of a sine wave-forming circuit appearing in FIG. 2.

FIG. 17 shows, by way of example, details of the sine wave-forming circuit 8, which is formed e.g. by a multiplexer 4051 such as μP74HC 4051 sold by NEC Corporation, etc. The multiplexer 4051 has an output terminal X which is connected to one of input terminals X0 to X7 or not connected to any of them depending on the states of terminals A, B, C, and IH. The input terminals X0 to X7 are connected to respective corresponding junctions of voltage-dividing resistances. Each junction has an electric potential level according to its electrical position. Voltages from different junctions, which are inputted via the input terminals X0 to X7, are sequentially outputted from the output terminal X in response to the frequency-divided signal inputted from the frequency divider 7 to the sine wave-forming circuit 8, to thereby form a sine wave signal having a stepped sinusoidal waveform, which is supplied via a terminal 8T4 to the electronic attenuator 9. Further, a clock signal is also supplied via a terminal 8T6 to the electronic attenuator 9. In FIG. 17, reference numeral 8T1 designates an input terminal for receiving the frequency-divided signal from the frequency divider 7, 8T2 an output terminal for supplying a pulse signal indicative of the phase of the oscillation signal to the phase difference detector 16, and 8T3 and 8T5 resetting terminals. The resetting terminals 8T3, 8T5 are supplied with the signal Q-bar, so that the sine wave signal starts to be outputted when the signal Q-bar falls, i.e. when the AC output voltage upwardly crosses a zero level, whereby the phase of the AC output voltage and the sine wave signal (target output waveform signal) are made coincident with each other.

Figure 18:
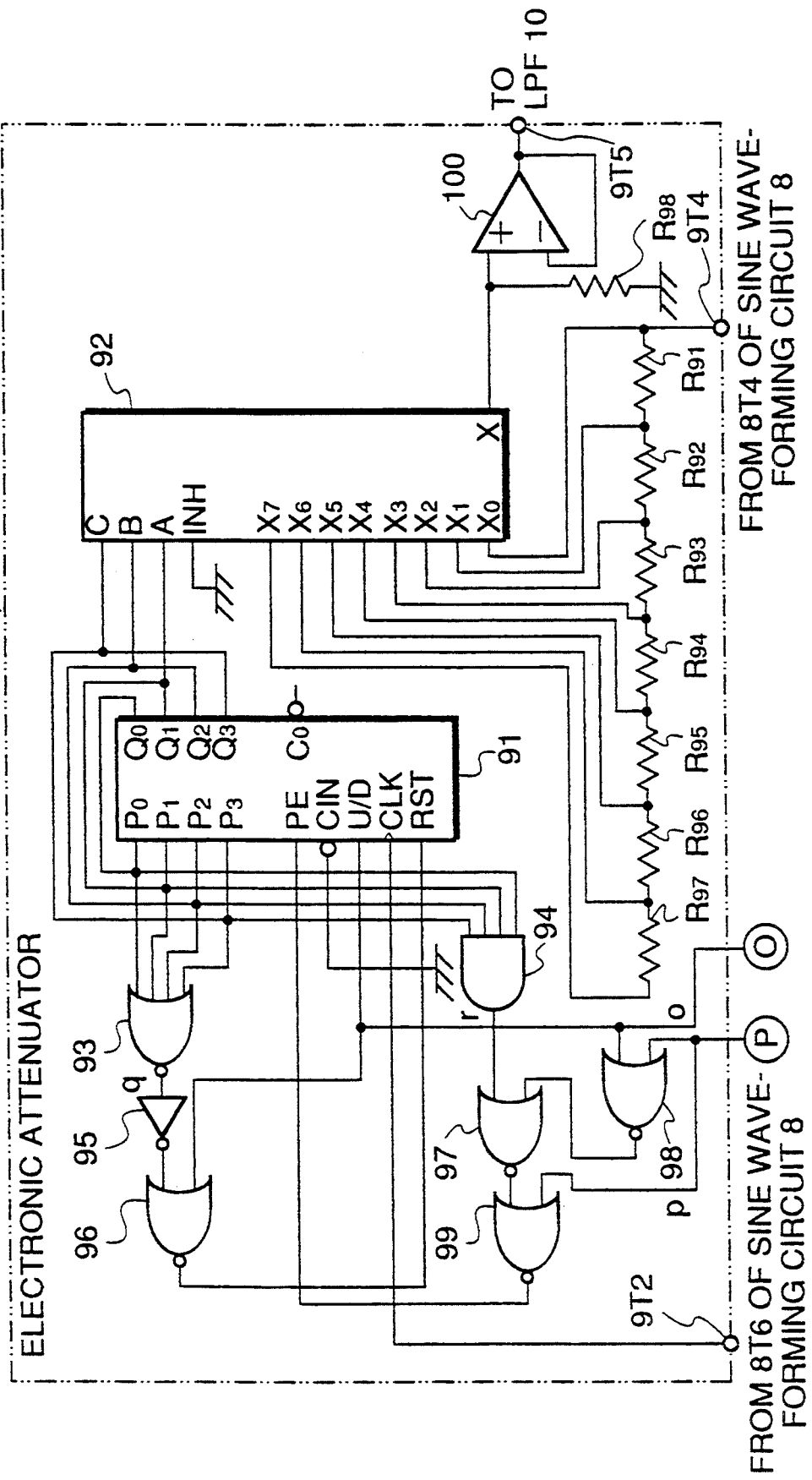
FIG. 18 is a circuit diagram showing an example of an electronic attenuator.

FIG. 18 shows, by way of example, details of the electronic attenuator 9 which is formed e.g. by the multiplexer 4051, referred to above, etc. The electronic attenuator 9 has input terminals 9T2 and 9T4 respectively supplied with a clock signal and the target output waveform signal from the sine wave-forming circuit 8.

The electronic attenuator 9 has an up-down counter 91 having terminals P0, P1, P2, and P3 connected respectively to terminals Q0, Q1, Q2, and Q3, with the terminals Q1, Q2, and Q3 connected to terminals A, B, and C of a multiplexer 92.

The terminals Q0, Q1, Q2, and Q3 are connected to the input terminals of each of a 4-input NOR circuit 93 and a 4-input AND circuit 94. The output of the NOR circuit 93 is connected via an invertor 95 to one input terminal of a NOR circuit 96, which has the other input terminal thereof connected to the output terminal O of the comparator circuit 25 and an up-down terminal U/D of the counter 91. The output of the NOR circuit 96 is connected to a resetting terminal RST of the counter 91.

The output of the AND circuit 94 is connected to one input terminal of the NOR circuit 97, which has the other input terminal connected to the output of a NOR circuit 98. The output of the NOR circuit 97 is connected to one input terminal of a NOR circuit 99, which has the other input terminal thereof connected to the output terminal P of the comparator circuit 25, which terminal P is also connected to one input terminal of the NOR circuit 98. The output of the NOR circuit 99 is connected to a preset-enabling terminal PE of the up-down counter 91, and the other input terminal of the NOR circuit 98 is connected to the output terminal O of the comparator circuit 25.

The multiplexer 92 has resistances R91 to R97 connected respectively between adjacent ones of input terminals X0 to X7, with the input terminal X0 connected to the aforementioned input terminal 9T4. An output terminal X of the multiplexer 92 is connected via an operational amplifier 100 serving as a buffer to an output terminal 9T5, which in turn is connected to the input of the LPF 10.

The electronic attenuator 9 is constructed as described above. Therefore, if the logical level of an output signal appearing at the output terminal O, and the logical level of an output signal appearing at the output terminal P of the comparator circuit 25 are represented by o and p, the logical level of an output signal from the NOR circuit 93 by q, and the logical level of an output signal from the AND circuit 94 by r, the logical expression of a signal PES inputted to the preset-enabling terminal PE of the up-down counter 91 is expressed as PES=[p]([o]+r) (hereinafter inversion in the logic is expressed by "[ ]"), the logical expression of a signal U/DS inputted to the up-down terminal U/D of same as U/DS=o, and the logical expression of a signal RSTS inputted to the resetting terminal RST as RSTS=q [o].

When the portable power unit according to the present embodiment is operating in the region i shown in FIG. 4, the logical level p is 1 and the logical level o is 0, so that PES=0, U/D S=0, and RSTS=q. Initially, the count value of the up-down counter 91 is equal to 0, and hence the logical level q=1, so that the up-down counter 91 is in a reset state in which counting operation thereof is inhibited. Accordingly, the multiplexer 92 directly outputs the signal inputted from the output terminal 8T4 of the sine wave-forming circuit 8 via the output terminal X, without modifying it.

When the output current increases closer to the point ii in FIG. 4 to cause the value of voltage indicative of the amount of output current from the power unit (i.e. the output from the operational amplifier 54 of the current detector 5) to exceed the second threshold value Vi2, the logical level o remains equal to 0, but p becomes equal to 0, so that PES=r (since the count value of the up-down counter remains equal to 0, the logical level r is equal to 0), U/DS=0, and RSTS=q (the logical level q is equal to 0 for the same reason mentioned above). Therefore, the up-down counter is in the reset state similarly to the above and inhibited from counting, and hence the output from the sine wave-forming circuit 8 is directly supplied as the output from the electronic attenuator 9 via the output terminal 9T5 to the LPF 10.

When the output current from the portable power unit increases to reach the point ii in FIG. 4, in other words, when the aforementioned voltage value indicative of the amount of the output current reaches the first threshold value Vi1 of the comparator circuit 25, the logical level o becomes equal to 1, and the logical level p remains equal to 0, and hence PES=r (the logical level r still remains equal to 0, U/DS=1, and RSTS=0, which cancels the reset state of the up-down counter 91 to cause same to start up-counting.

The description will be continued, assuming that two portable power units $S_{10}$, $S_{20}$ of the type of the present embodiment are in parallel operation. The power units $S_{10}$, $S_{20}$ have unavoidable variations within allowable tolerances with respect to the rated output voltage (the variations necessarily occur from one power unti to another). Let it be assumed that the power unit $S_{10}$ has a characteristic of outputting higher voltage than the power unit $S_{20}$. The power unit $S_{10}$ is regarded as the present power unit. As described hereinbefore, when the output current from the present power unit $S_{10}$ reaches a value 15A corresponding to the first threshold value Vi1, the output current from the other power unit $S_{20}$ is 11A, with an amount cf 4A left before it reaches 15A. If the up-down counter 91 of the present power unit $S_{10}$ starts up-counting, the multiplexer 92 switches the connection between the input terminals X0 to X7 and the output terminal X whenever the up-down counter 91 counts two clock pulses. Note specifically, when the up-down counter 91 first counts two clock pulses, the input terminal X1 is connected to the output terminal X, and accordingly, the output signal from the output terminal 9T5 of the electronic attenuator 9 is damped to a level equivalent to the product of the signal inputted from the input terminal 9T4 multiplied by R98/(R91+R98). When further two clock pulses are counted, the input terminal X2 is connected to the output terminal X, so that the output signal from the output terminal 9T5 of the electronic attenuator 9 is damped to a level equivalent to the product of the signal inputted from the input terminal 9T4 multiplied by R98/(R91+R92+R98), and so forth. The output signal from the electronic attenuator 9 is thus progressively damped whenever the up-down counter 91 counts two clock pulses, and when it has counted 14 clock pulses, the input terminal X7 of the multiplexer 92 is connected to the output terminal X, so that the level of the output signal from the output terminal 9T5 of the electronic attenuator 9 becomes equivalent to the product cf the level of the input signal inputted from the input terminal 9T4 multiplied by:

$$R98/\left(\sum_{K=91}^{97} Rk + R98\right).$$

By this damping process, the output voltage from the present power unit progressively decreases from the point ii toward the point iii in FIG. 5 whenever the connection between the input terminals X0 to X7 and the output terminal X is changed over, eventually reaching the point iii in FIG. 5 after a drop of Vd=4 [V].

According to the present embodiment explained above with reference to FIG. 5, at a time point the output voltage from the present power unit $S_{10}$ has decreased by 2 V (corresponding to the point vi in the figure), the output current from the other power unit $S_{20}$ also becomes equal to 15 A, whereby the maximum output current available by the parallel operation i.e. 15 A+15 A=30 A, is obtained. Therefore, if the load current required is within a range of 26 A to 30 A, the output voltages from the two power units are balanced with each other between the points ii and vi, so that the output voltage from the present power unit does not reach the point iii.

Thus, although according to the prior art, the total output power available from the parallel operation would be limited to a value obtained when the output current from one power unit has reached its maximum value, the present invention enables to obtain the total output power obtained when both the output currents from the power units have reached the respective maximum values.

Then, if a current of 30 A is still insufficient, and the up-down counter 91 further counts one more clock pulse to cause the logical levels of the output signals from all the terminals Q0 to Q3 to become equal to 1, the logical level r becomes equal to 1, while the logical level o remains equal to 1, and the logical level p to 0, so that PES becomes equal to 1, whereby the count value of the up-down counter 91 is held at the present value while inhibiting the changeover of connection between the input terminals and the output terminal.

If the output current from the power unit $S_{10}$ decreases from this state of the up-down counter 9 to cause the aforementioned voltage value indicative of the output current to become lower than the first threshold value Vi1 of the comparator circuit 25 in FIG. 9, the logical level o of the output signal from the terminal O of the comparator 25 becomes equal to "0" and the logical level p of the output signal from the terminal P of same remains equal to 0. However, in this state, the logical level PES of the signal inputted PE of the up-down counter 91 remains equal to 1, and the logical level RSTS of the signal inputted to the resetting terminal of same is equal to 0 and hence resetting operation is not effected. Accordingly, the count value of the up-down counter 91 remains unchanged. Therefore, in the present state, the electronic attenuator 9 does not operate, so that the output current from the present power unit progressively decreases, according to the output characteristic thereof in which the output voltage characteristic is shifted toward a lower level, while the output voltage is progressively rising, until the output power reaches the point iv in FIG. 5.

When the aforementioned voltage value indicative of the output current decreases to reach the second threshold value Vi2 of the comparator circuit 25, which corresponds to the point iv in FIG. 5, the logical level o remains equal to 0 and the logical level p becomes equal to 1, so that PES=0, U/DS=0, and RSTS=q=0, whereby the up-down counter 91 starts down-counting from the count value of "15". Changeover of connection between the input terminals X0 to X7 and the output terminal X is sequentially carried out in the order reverse to that in the case of up-counting described hereinbefore. Accordingly, the output voltage from the present portable power unit returns from the point iv toward the range i in FIG. 5, until 15 clock pulses are counted to cause the logical level q to become equal to 1 and the logical level RSTS to become equal to 1, whereby the up-down counter 91 returns to its original state.

Figure 6:
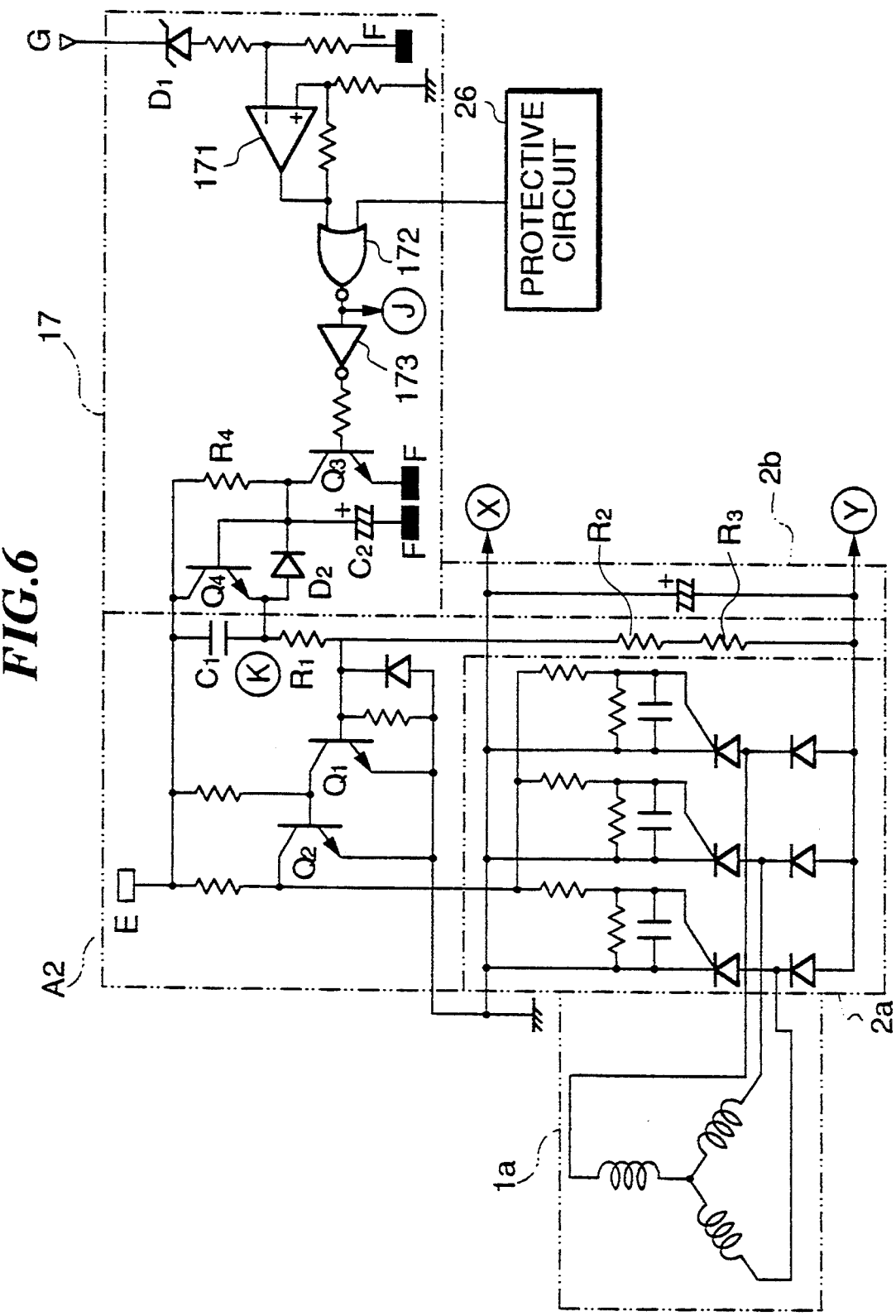
FIG. 6 is a circuit diagram showing details of a rectifying/smoothing circuit, an operation/stoppage control device and their related components of the portable power unit shown in FIG. 2.
Figure 7:
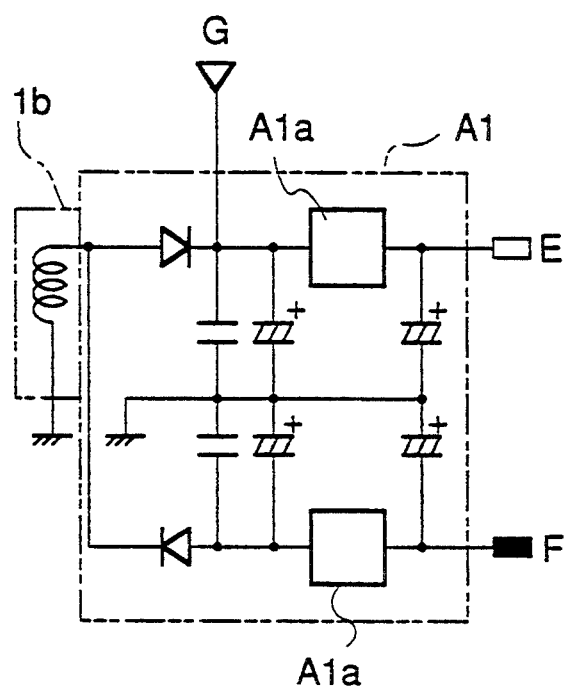
FIG. 7 is a circuit diagram showing details of a constant-voltage regulator circuit and its related components of the portable power unit shown in FIG. 2.

In addition, when o=1, the counter of the protective circuit 26 in FIG. 6 starts counting, and if the state of o=1 continues over a predetermined time period to cause the count value of the counter to reach a predetermined value, the output from the protective circuit 26 goes high, whereby the invertor circuit 3a is inhibited from operating to cut off the supply of output power from the present power unit.

Further, although in the above described embodiment, there has been described a case in which the output voltage from the present power unit $S_{10}$ is higher than the other power unit $S_{20}$, in the case where the output voltage from the other power unit $S_{20}$ is higher than that of the present one $S_{10}$, the present power unit $S_{10}$ will operate similarly to the other power unit $S_{20}$ of the present embodiment.

What is claimed is:

1. A portable power unit having an alternating current generator having a primary output winding, a rectifier circuit for rectifying an alternating current generated by said primary output winding into a direct current, a smoothing circuit for smoothing said direct current from said rectifier circuit to produce a smoothed direct current, an invertor circuit responsive to a driving signal, for effecting switching control of said smoothed direct current, electric current-detecting means for detecting an amount of an output current from said invertor circuit, and a protective circuit, said protective circuit comprising:

means for cutting off said output current when said amount of said output current detected by said electric current-detecting means increases to a current value which can be assumed when said power unit is in an overload state;

voltage-reducing means for progressively reducing an output voltage from said power unit as time elapses, within a predetermined voltage range, when said amount of said output current detected by said electric current-detecting means increases to a first threshold value which is smaller than said current value which can be assumed when said power unit is in said overload state; and canceling means for canceling a voltage reduction operation of said voltage-reducing means, when said amount of said output current decreases to a second threshold value which is smaller than said first threshold value, while said power unit is in a state in which said output voltage is reduced to a lower limit value of said predetermined voltage range by said voltage-reducing means;

said protective circuit cutting off said output current by stopping said switching operation of said invertor circuit when said amount of said output current increases to said current value which can be assumed when said power unit is in said overload state, while said power unit is in said state in which said output voltage is reduced to said lower limit value of said predetermined voltage range by said voltage-reducing means.

2. A portable power unit according to claim 1, including:

output voltage phase-detecting means for detecting a phase of voltage of said alternating current output having said predetermined frequency and for generating a signal indicative of the detected phase of voltage of said alternating current output;

output current phase-detecting means for detecting a phase of current of said alternating current output having said predetermined frequency and for generating a signal indicative of the detected phase of current of said alternating current output;

phase difference-detecting means for detecting a phase difference between the detected phase of voltage and the detected phase of current and for generating a signal indicative of the detected phase difference; and feedback means for controlling said driving signal supplied to said invertor circuit in a feedback manner based on said signal indicative of the detected phase difference outputted from said phase difference-detecting means, such that the phase difference is reduced.

3. A portable power unit according to claim 2, wherein said protective circuit includes means for cutting off said output current when said output current has continued to be equal to or larger than said first threshold value over a predetermined time period.

4. A portable power unit according to claim 1, wherein said protective circuit includes means for cutting off said output current when said output current has continued to be equal to or larger than said first threshold value over a predetermined time period.

5. A portable power unit according to claim 1, wherein:

said portable power unit has an output voltage vs. output current characteristic such that as the output current increases, the output voltage decreases; and said portable power unit is operable in single operation or in parallel operation with at least one additional power unit.

6. A portable power unit according to claim 5, wherein:

said portable power unit operates in parallel with at least one additional power unit; and said first and second threshold values are set to values dependent upon said output voltage vs. output current characteristic of said portable power unit and a variation between said output voltage vs. output current characteristic of said portable power unit and an output voltage vs. output current characteristic of said at least one additional power unit with which said portable power unit operates in parallel.

7. A portable power unit according to claim 1, wherein said output current is held substantially constant while said voltage-reducing means is reducing said output voltage.

8. A portable power unit according to claim 7, wherein:

said portable power unit operates in parallel with at least one additional power unit; and said first and second threshold values are set to values dependent upon said output voltage vs. output current characteristic of said portable power unit and a variation between said output voltage vs. output current characteristic of said portable power unit and an output voltage vs. output current characteristic of said at least one additional power unit with which said portable power unit operates in parallel.

* * * * *